US007782508B2

(12) United States Patent
Kondo

(10) Patent No.: US 7,782,508 B2
(45) Date of Patent: Aug. 24, 2010

(54) PRINTING MEDIUM SEPARATION APPARATUS, PRINTING MEDIUM SEPARATION PROGRAM, STORAGE MEDIUM STORING THE PROGRAM, PRINTING MEDIUM SEPERATION METHOD, PRINTING DEVICE, PRINTING DEVICE CONTROL PROGRAM, STORAGE MEDIUM STORING THE PROGRAM, AND PRINTING DEVICE CONTROL METHOD

(75) Inventor: Takamitsu Kondo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 409 days.

(21) Appl. No.: 11/872,142

(22) Filed: Oct. 15, 2007

(65) Prior Publication Data

US 2008/0088861 A1 Apr. 17, 2008

(30) Foreign Application Priority Data

Oct. 17, 2006 (JP) ............................ 2006-282270

(51) Int. Cl.
*H04N 1/46* (2006.01)
*G06K 15/22* (2006.01)
*G06K 15/00* (2006.01)
*B65H 39/10* (2006.01)

(52) U.S. Cl. ..................... 358/538; 358/1.14; 358/1.18; 271/288

(58) Field of Classification Search ....................... None
See application file for complete search history.

(56) References Cited

U.S. PATENT DOCUMENTS

| | | | | |
|---|---|---|---|---|
| 2004/0080787 | A1* | 4/2004 | Kakikawa et al. | 358/1.18 |
| 2004/0252314 | A1* | 12/2004 | Takahashi | 358/1.1 |
| 2007/0236720 | A1* | 10/2007 | Tamada et al. | 358/1.14 |
| 2007/0273914 | A1* | 11/2007 | Hosoda | 358/1.14 |

FOREIGN PATENT DOCUMENTS

| | | |
|---|---|---|
| JP | 10-293503 | 11/1998 |
| JP | 2001-226031 | 8/2001 |

* cited by examiner

*Primary Examiner*—Twyler L Haskins
*Assistant Examiner*—Barbara D Reinier
(74) *Attorney, Agent, or Firm*—Workman Nydegger

(57) ABSTRACT

A printing medium separation apparatus, including: a density information extraction unit that extracts density information about a predetermined printing area of a printing medium for use to print an image; an area partition unit that partitions the printing area into a plurality of partition areas; a blank amount calculation unit that calculates, based on the density information extracted for each of the partition areas being results of partitioning by the area partition unit, a blank amount of each of the partition areas; and a separation unit that subjects the printing medium to separation based on a result of calculating by the blank amount calculation unit.

3 Claims, 15 Drawing Sheets

| BLANK RATIO | EJECTION SORTER |
|---|---|
| 100% | TRAY 1 |
| 65%～99% | TRAY 2 |
| 45%～64% | TRAY 3 |
| 20%～44% | TRAY 4 |
| 0%～19% | TRAY 5 |

FIG. 7

| AREA NUMBER | START POINT | END POINT | BLANK SPACE | PROXIMAL AREA(S) |
|---|---|---|---|---|
| 1 | (0, 0) | (5999, 1999) | ○ | 2 |
| 2 | (0, 0) | (5999, 1999) | ○ | 3 |
| 3 | (0, 2000) | (5999, 2999) | ○ | 4 |
| 4 | (0, 3000) | (5999, 3999) | × | 5 |
| 5 | (0, 4000) | (5999, 4999) | ○ | 6 |
| 6 | (0, 5000) | (5999, 5999) | × | 7 |
| 7 | (0, 6000) | (5999, 7999) | ○ | 8 |
| 8 | (0, 6000) | (5999, 7999) | ○ | 9, 10, 11, 12, 13, 14, 15, 16 |
| 9 | (0, 4000) | (1499, 7999) | ○ | 10 |
| 10 | (0, 4000) | (1499, 7999) | ○ | 11 |
| 11 | (1500, 4000) | (2249, 7999) | ○ | 12 |
| 12 | (2250, 4000) | (2999, 7999) | × | 13 |
| 13 | (3000, 4000) | (3749, 7999) | × | 14 |
| 14 | (3750, 4000) | (4499, 7999) | × | 15 |
| 15 | (4500, 4000) | (5249, 7999) | × | 16 |
| 16 | (5250, 4000) | (5999, 7999) | ○ | |

FIG. 12

| BLANK RATIO | EJECTION DESTINATION |
| --- | --- |
| 100% | PAPER-FEED TRAY 1 |
| 50%～99% (AREA IN LATERAL DIRECTION) | PAPER-FEED TRAY 2 |
| 50%～99% (AREA IN VERTICAL DIRECTION) | PAPER-FEED TRAY 3 |
| 20%～49% | PAPER-EJECT TRAY 1 |
| ～19% | PAPER-EJECT TRAY 2 |
FIG. 15
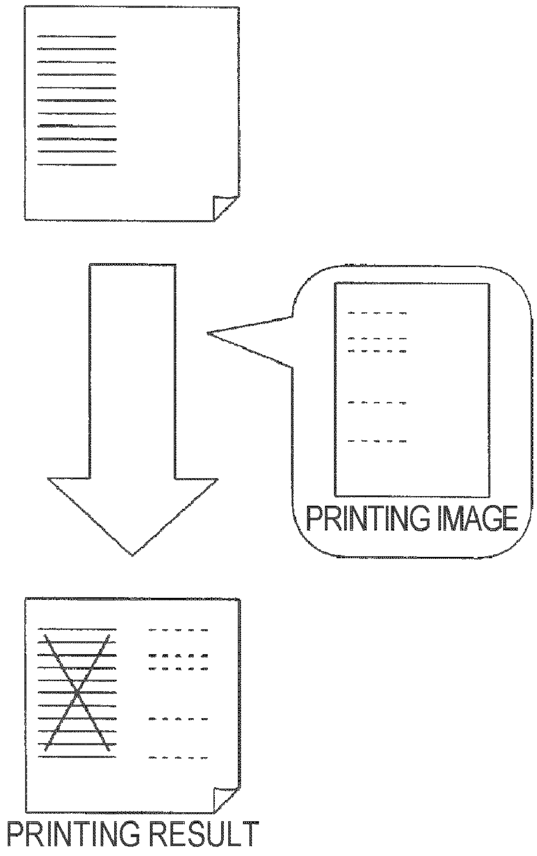
FIG. 16A
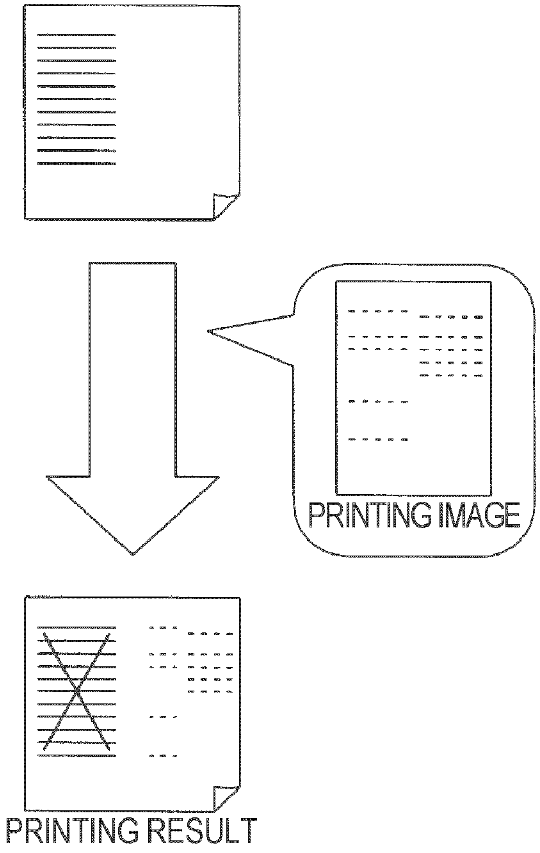
FIG. 16B

PRINTING MEDIUM SEPARATION APPARATUS, PRINTING MEDIUM SEPARATION PROGRAM, STORAGE MEDIUM STORING THE PROGRAM, PRINTING MEDIUM SEPERATION METHOD, PRINTING DEVICE, PRINTING DEVICE CONTROL PROGRAM, STORAGE MEDIUM STORING THE PROGRAM, AND PRINTING DEVICE CONTROL METHOD

BACKGROUND

1. Technical Field

The present invention relates to a printing medium separation apparatus, a printing medium separation program, a storage medium storing therein the program, a printing medium separation method, a printing device, a printing device control program, a storage medium storing therein the program, and a printing device control method, all of which are suitable for use of separating an image-printed printing medium into a group of reusable or a group of not reusable.

2. Related Art

When a printing paper is printed with an image on one surface side with the other side left unprinted and the printed paper becomes redundant, the paper is often reused as a scratch paper or again as a printing paper as is blank on the other surface side.

There are various types of technology of automatically identifying whether a paper is a plain blank paper or a paper one surface side of which is printed but the other surface side remains blank (hereinafter, such a paper is referred to as one-side-blank paper), e.g., Patent Document 1 (JP-A-2001-226031) describes a document separation apparatus, and Patent Document 2 (JP-A-10-293503) describes an image forming apparatus.

The document separation apparatus of Patent Document 1 is configured to include: a document transfer unit that transfers a document; an image reading unit that takes charge of image reading from the document in transfer; an image forming unit that outputs a visible image on a predetermined recording medium; a sorting/ejection unit that sorts and ejects the recording medium after image output; a document identification unit that identifies the document by type being the object for image reading; and a separation/ejection unit that separates, based on the identified type of the document, the document after image reading into types, and ejects the document to the sorting/ejection unit. With such a configuration, the document separation apparatus identifies what paper type a document is, whether the document is printed with images on one or both surface sides, and others, and separates and ejects the document based on the identified type.

The image forming apparatus of Patent Document 2 is configured to include: a unit of generating a signal indicating whether a paper loaded to an automatic document feeder (ADF) is a document or a recording paper; a transfer unit that can transfer an ADF-provided recording paper to a feeding unit; and a unit of recognizing, using the signal coming from the signal generation unit, whether the ADF-provided recording paper is blank on the surface based on image information provided by a sensor for the recording paper, and when the recording paper has the blank surface, transferring the recording paper having reached the transfer unit by the transfer by the ADF as such to a paper-feeding unit. With such a configuration, when the recording paper is blank at least on one surface or the other, the recording paper is supplied by the paper-feeding unit for image formation on the blank surface thereof.

The issue here is that, although Patent Document 1 indeed describes the manner of classifying papers into those printed with images only on one surface side, i.e., one-side-blank papers, and those printed with images on both sides or with no image on either surface side, i.e., both-side-blank papers or both-side-printed papers, there is no description at all of identifying how much blank space is left in the both-side-printed paper, and of separating the paper in accordance with the amount of the blank space.

Another issue is that, although Patent Document 2 indeed describes the manner of identifying whether the paper surface is blank or not, and forming (printing) an image on the surface identified as being blank, there is no description at all of identifying how much blank space is left in the image-formed paper, and of forming another image on the blank space when the blank amount is of a predetermined value or larger, for example.

That is, even if a paper is printed with images on both surface sides, depending on the size of the blank space, the paper may be cut and reused as a scratch paper, or be printed again with images on the blank space. However, the technologies of Patent Documents 1 and 2 only identify a paper one surface side of which is perfectly plain blank, and any paper still available for use with some blank space, e.g., half of the paper is blank, is not regarded as being available for recycling use. As such, in view of recycling use, the manner of paper separation of the technologies is not serving well enough.

SUMMARY

An advantage of some aspects of the invention is to provide a printing medium separation apparatus, a printing medium separation program, a storage medium storing therein the program, a printing medium separation method, a printing device, a printing device control program, a storage medium storing therein the program, and a printing device control method, all of which are suitable for use of subjecting a printing medium to separation in accordance with the amount of a blank space.

First Aspect

A first aspect of the invention is directed to a printing medium separation apparatus, including: a density information extraction unit that extracts density information about a predetermined printing area of a printing medium for use to print an image; an area partition unit that partitions the printing area into a plurality of partition areas; a blank amount calculation unit that calculates, based on the density information extracted for each of the partition areas being results of partitioning by the area partition unit, a blank amount of each of the partition areas; and a separation unit that subjects the printing medium to separation based on a result of calculating by the blank amount calculation unit.

With such a configuration, by the density information extraction unit, density information can be extracted for a printing area of a printing medium for use to print an image.

The area partition unit is capable of partitioning the printing area into a plurality of partition areas.

After the printing area is partitioned, the blank amount calculation unit can calculate the amount of a blank space for each of the partition areas based on the density information extracted for each of the partition areas being the partition results of the area partition unit. After the amount of a blank space is calculated as such, the separation unit can subject the printing medium to separation based on the calculation result.

As such, the printing medium can be separated in accordance with the amount of a blank space of each of the partition areas in the printing area. This thus enables to subject a plurality of printing media to separation based on the size of the blank space or based on the reuse purpose, e.g., for use as scratch paper or for printing again.

This favorably enables to subject any printing medium such as both-side-printed printing paper to separation based on a result of calculating the amount of a blank space, thereby favorably leading to effects of being able to reuse the printing medium with high efficiency.

With the configuration, a printing area can be partitioned into a plurality of partition areas, and the resulting partition areas can be subjected to calculation of the amount of a blank space. With the partitioning of an area into partition areas of a minimum possible size based on the reuse purpose, there are effects of being able to classify printing media for reuse with no waste.

Herein, the term of "printing area" denotes an area of a printing medium, e.g., a paper surface if with a printing paper, available for printing of an image. In the aspects of the invention, there is no restriction for a material of printing media as long as the blank space thereof is available for recycling use. This is applicable to, in the following aspects, a printing medium separation apparatus, a printing medium separation program, a storage medium storing therein the program, a printing medium separation method, a printing device, a printing device control program, a storage medium storing therein the program, and a printing device control method.

The "area partition unit" may partition a printing area into a plurality of partition areas, or partition image information of a printing area, i.e., density information, into a plurality of partition areas. That is, as long as the amount of a blank space can be calculated for each of partition areas of a printing area, the type of method therefor is not an issue. This is applicable to, in the following aspects, a printing medium separation apparatus, a printing medium separation program, a storage medium storing therein the program, a printing medium separation method, a printing device, a printing device control program, a storage medium storing therein the program, and a printing device control method.

The term of "blank space" denotes a printing area of a printing medium where no image is printed, and the term of "amount of blank space" denotes an amount indicating the size of a blank space, e.g., area of a blank space. That is, if with a white printing paper, a white portion printed with no image will be the blank space. This is applicable to, in the following aspects, a printing medium separation apparatus, a printing medium separation program, a storage medium storing therein the program, a printing medium separation method, a printing device, a printing device control program, a storage medium storing therein the program, and a printing device control method.

Moreover, the "selection unit" subjects a printing medium to separation based on the entire amount of a blank space of a printing area, or based on the maximum possible amount of a blank space of every partition area, for example. After the separation of printing medium as such, the printing medium may be ejected onto its corresponding tray, which is provided for every size of the amount of a blank space. This is applicable to, in the following aspects, a printing medium separation apparatus, a printing medium separation program, a storage medium storing therein the program, a printing medium separation method, a printing device, a printing device control program, a storage medium storing therein the program, and a printing device control method.

Second Aspect

In a second aspect of the invention, in the printing medium separation apparatus of the first aspect, the printing medium is a printing paper, and the printing area is at least one of two surfaces of the printing paper.

Such a configuration favorably enables to subject any paper printed with images to separation based on a result of calculating the amount of a blank space, thereby favorably leading to effects of being able to reuse the printing paper with high efficiency. If the paper is separated onto any of a plurality of printing trays based on the size of the blank space, of if the paper is separated onto a tray for scratch paper use, the printing paper can be used again with good efficiency.

Third Aspect

In a third aspect of the invention, in the printing medium separation apparatus of the first or second aspect, based on the blank amount calculated for each of the partition areas, the blank amount calculation unit determines whether each of the partition areas is blank or not, and based on a determination result, calculates a blank ratio for the printing area, and the separation unit subjects the printing medium to the separation based on the blank ratio being a result of calculating by the blank amount calculation unit.

With such a configuration, the amount of a blank space calculated for each of the partition areas can be used as a basis to determine whether the partition areas are each having enough blank space for recycling use, and to calculate a blank ratio. The blank ratio is the one indicating the ratio of the partition area(s) determined as being blank with respect to the printing area. Because this blank ratio can be used as a basis for separation of printing media, the separation will be enhanced with ease of reuse.

Fourth Aspect

According to a fourth aspect of the invention, in the printing medium separation apparatus of the third aspect, the blank amount calculation unit calculates a total number of the partition areas of an area in which two or more of the partition areas determined as being blank are located in a row, and based on the total number being a calculation result, calculates the blank ratio.

With such a configuration, when a printing area is partitioned into relatively small size, for example, any blank space being apart from others in the printing area can be removed for calculation of a blank ratio. That is, any blank space found being apart from others of small-sized partition areas is difficult for recycling use. In this sense, performing separation of printing media based on a blank ratio calculated with no such blank space being apart from others leads to good effects in view of recycling use, i.e., any printing medium still good for recycling use can be separated for the purpose without fail.

Fifth Aspect

According to a fifth aspect of the invention, in the printing medium separation apparatus of any one of the first to fourth aspects, a blank image line counting unit is further included for counting, based on the density information about the predetermined printing area specifically for a plurality of image lines in a vertical direction and for a plurality of image lines in a lateral direction, for each of the directions, a number of blank image lines each configured by a pixel of a density value indicating a color of white. In the printing medium separation apparatus, the area partition unit partitions, based on a result of counting by the blank image line counting unit, the predetermined printing area into the plurality of partition areas.

With such a configuration, the blank image line counting unit can count the number of blank image lines each configured by pixels of a density value indicating a color of white.

Such counting is made based on the density information about the printing area specifically for a plurality of image lines in a vertical direction and for a plurality of image lines in a lateral direction, and is made for each of the directions. The area partition unit can partition, based on a result of counting by the blank image line counting unit, the predetermined printing area into a plurality of partition areas.

Accordingly, if with image data of a printing area in which the blank image line in the lateral direction is larger in number than that in the vertical direction, for example, the printing area is partitioned into a plurality of partition areas, each of which is shaped rectangular configured by the image lines in the lateral direction. Such partitioning favorably enables to make a determination about a blank space in the printing area with higher accuracy. This thus leads to the effects of being able to perform separation with better efficiency with less waste.

Sixth Aspect

According to a sixth aspect of the invention, in the printing medium separation apparatus of the fifth aspect, the area partition unit repeatedly subjects each of the partition areas to the counting of the blank image lines by the blank image line counting unit, and based on the result of counting, to the partitioning by the area partition unit until the printing area is partitioned into a desired number of partition areas.

With such a configuration, partitioning of a printing area is performed in accordance with the distribution of the blank image lines in the lateral direction and those in the vertical direction, i.e., an area portion with the larger number of the blank image line in the lateral direction is partitioned into partition areas, each of which is shaped rectangular configured by the image lines in the lateral direction, and an area portion with the larger number of the blank image line in the vertical direction is partitioned into partition areas, each of which is shaped rectangular configured by the image lines in the vertical direction. As such, a printing area can be partitioned into partition areas in the shape appropriate for calculation of the amount of a blank space so that a determination about a blank space in the printing area can be made with higher accuracy. This thus leads to the effects of being able to perform separation with better efficiency with less waste in view of reuse.

Seventh Aspect

According to a seventh aspect of the invention, in the printing medium separation apparatus of any one of the first to sixth aspects, when the blank amount of the predetermined printing area of the printing medium is of a predetermined value or smaller, any other printing area of the printing medium not yet through with the calculating of the blank amount is subjected to the extracting of the density information, the partitioning of the printing area, and the calculating of the blank amount, and the separation unit subjects the printing medium to the separation based on the result of calculating the blank amount.

With such a configuration, if with a printing medium being a printing paper, for example, when the amount of a blank space on one paper surface is smaller than a predetermined value, e.g., smaller than a blank ratio of 100[%], there are effects of being able to automatically calculate the amount of a blank space for the remaining paper surface. What is better, based on the amounts of a blank space calculated as such, the printing medium can be separated with higher accuracy in view of recycling use.

Eighth Aspect

According to an eighth aspect of the invention, in the printing medium separation apparatus of any one of the first to seventh aspects, an image data generation unit is further included for generating, based on the density information extracted by the density information extraction unit, area image data being image data for the printing area. In the printing medium separation apparatus, the blank amount calculation unit calculates the blank amount for each of the partition areas based on the area image data of each of the partition areas being the results of partitioning by the area partition unit.

With such a configuration, the image data generation unit can generate, based on the density information extracted by the density information extraction unit, image data for the printing area, and the blank amount calculation unit can calculate the amount of a blank space for each of the partition areas based on the area image data of each of the partition areas being partition results of the area partition unit.

When any known image scanner or others are used to scan a printing area, for example, density information about every pixel of the printing area can be extracted with any predetermined resolution. This thus enables to generate binary image data by binarizing the density information, and to generate image data free from any component of the underside image at the time of scanning, for example.

Ninth Aspect

A ninth aspect of the invention is directed to a printing medium separation program for use for execution by a computer, including: extracting density information about a predetermined printing area of a printing medium for use to print an image; partitioning the printing area into a plurality of partition areas; calculating, based on the density information extracted for each of the partition areas being results by the partitioning, a blank amount of each of the partition areas; and subjecting the printing medium to separation based on a result of the calculating.

With such a configuration, when the program is read by a computer, and when the computer starts executing processes in accordance with the program read as such, the effects and advantages similar to those of the printing medium separation apparatus of the first aspect can be derived.

Moreover, partially rewriting the program leads to easy version up by function modification or improvement, for example. This is applicable to the following aspects of a printing medium separation program.

Tenth Aspect

According to a tenth aspect of the invention, in the printing medium separation program of the ninth aspect, the printing medium is a printing paper, and the printing area is at least one of two surfaces of the printing paper.

With such a configuration, when the program is read by a computer, and when the computer starts executing processes in accordance with the program read as such, the effects and advantages similar to those of the printing medium separation apparatus of the second aspect can be derived.

Eleventh Aspect

According to an eleventh aspect of the invention, in the printing medium separation program of the ninth or tenth aspect, based on the blank amount calculated for each of the partition areas, the calculating determines whether each of the partition areas is blank or not, and based on a determination result, calculates a blank ratio for the printing area, and the separating subjects the printing medium to the separation based on the blank ratio being a result of the calculating.

With such a configuration, when the program is read by a computer, and when the computer starts executing processes in accordance with the program read as such, the effects and advantages similar to those of the printing medium separation apparatus of the third aspect can be derived.

Twelfth Aspect

According to a twelfth aspect of the invention, in the printing medium separation program of the eleventh aspect, the calculating calculates a total number of the partition areas of an area in which two or more of the partition areas determined as being blank are located in a row, and based on the total number being a calculation result, calculates the blank ratio.

With such a configuration, when the program is read by a computer, and when the computer starts executing processes in accordance with the program read as such, the effects and advantages similar to those of the printing medium separation apparatus of the fourth aspect can be derived.

Thirteenth Aspect

According to a thirteenth aspect of the invention, in the printing medium separation program of any one of the ninth to twelfth aspects, for use for execution by a computer, a program is further included for counting, based on the density information about the predetermined printing area specifically for a plurality of image lines in a vertical direction and for a plurality of image lines in a lateral direction, for each of the directions, a number of blank image lines each configured by a pixel of a density value indicating a color of white. In the printing medium separation program, the partitioning partitions, based on a result of the counting, the predetermined printing area into the plurality of partition areas.

With such a configuration, when the program is read by a computer, and when the computer starts executing processes in accordance with the program read as such, the effects and advantages similar to those of the printing medium separation apparatus of the fifth aspect can be derived.

Fourteenth Aspect

According to a fourteenth aspect of the invention, in the printing medium separation program of the thirteenth aspect, the partitioning repeatedly subjects each of the partition areas to the counting of the blank image lines by the counting, and based on the result of the counting, to the partitioning by the partitioning until the printing area is partitioned into a desired number of partition areas.

With such a configuration, when the program is read by a computer, and when the computer starts executing processes in accordance with the program read as such, the effects and advantages similar to those of the printing medium separation apparatus of the sixth aspect can be derived.

Fifteenth Aspect

According to a fifteenth aspect of the invention, in the printing medium separation program of any one of the ninth to fourteenth aspects, when the blank amount of the predetermined printing area of the printing medium is of a predetermined value or smaller, any other printing area of the printing medium not yet through with the calculating of the blank amount is subjected to the extracting of the density information, the partitioning of the printing area, and the calculating of the blank amount, and the separating subjects the printing medium to the separation based on the result of calculating the blank amount.

With such a configuration, when the program is read by a computer, and when the computer starts executing processes in accordance with the program read as such, the effects and advantages similar to those of the printing medium separation apparatus of the seventh aspect can be derived.

Sixteenth Aspect

According to a sixteenth aspect of the invention, in the printing medium separation program of any one of the ninth to fifteenth aspects, for use for execution by a computer, a program is further included for generating, based on the density information extracted by the extracting, area image data being image data for the printing area. In the printing medium separation program, the calculating calculates the blank amount for each of the partition areas based on the area image data of each of the partition areas being the results by the partitioning.

With such a configuration, when the program is read by a computer, and when the computer starts executing processes in accordance with the program read as such, the effects and advantages similar to those of the printing medium separation apparatus of the eighth aspect can be derived.

Seventeenth Aspect

A seventeenth aspect of the invention is directed to a computer-readable storage medium storing therein the printing medium separation program of any one of the ninth to sixteenth aspects.

This enables easy and reliable provision of the printing medium separation program of any one of the ninth to sixteenth aspects to a user or others via a computer-readable storage medium such as CD-ROMs (Compact Disk Read-Only Memory), DVD-ROMs (Digital Versatile Disc Read-Only Memory), FDs (Flexible Disks), and semiconductor chips.

Eighteenth Aspect

An eighteenth aspect of the invention is directed to a printing medium separation method, including: extracting density information about a predetermined printing area of a printing medium for use to print an image; partitioning the printing area into a plurality of partition areas; calculating, based on the density information extracted for each of the partition areas being results by the partitioning, a blank amount of each of the partition areas; and subjecting the printing medium to separation based on a result of the calculating.

This leads to effects and advantages similar to those of the printing medium separation device of the first aspect.

Nineteenth Aspect

According to a nineteenth aspect of the invention, in the printing medium separation method of the eighteenth aspect, the printing medium is a printing paper, and the printing area is at least one of two surfaces of the printing paper.

This leads to effects and advantages similar to those of the printing medium separation device of the second aspect.

Twentieth Aspect

According to a twentieth aspect of the invention, in the printing medium separation method of the eighteenth or nineteenth aspect, based on the blank amount calculated for each of the partition areas, the calculating determines whether each of the partition areas is blank or not, and based on a determination result, calculates a blank ratio for the printing area, and the separating subjects the printing medium to separation based on the blank ratio being a result of the calculating.

This leads to effects and advantages similar to those of the printing medium separation device of the third aspect.

Twenty-first Aspect

According to a twenty-first aspect of the invention, in the printing medium separation method of the twentieth aspect, the calculating calculates a total number of the partition areas of an area in which two or more of the partition areas determined as being blank are located in a row, and based on the total number being a calculation result, calculates the blank ratio.

This leads to effects and advantages similar to those of the printing medium separation device of the fourth aspect.

Twenty-second Aspect

According to a twenty-second aspect of the invention, in the printing medium separation method of any one of the eighteenth to twenty-first aspects, counting is further included for counting, based on the density information about the predetermined printing area specifically for a plurality of image lines in a vertical direction and for a plurality of image lines in a lateral direction, for each of the directions, a number of blank image lines each configured by a pixel of a density value indicating a color of white. In the printing medium separation method, the partitioning is included for partitioning, based on a result of the counting, the predetermined printing area into the plurality of partition areas.

This leads to effects and advantages similar to those of the printing medium separation device of the fifth aspect.

Twenty-third Aspect

According to a twenty-third aspect of the invention, in the printing medium separation method of the twenty-second aspects, the partitioning repeatedly subjects each of the partition areas to the counting of the blank image lines by the counting, and based on the result of the counting, to the partitioning until the printing area is partitioned into a desired number of partition areas.

This leads to effects and advantages similar to those of the printing medium separation device of the sixth aspect.

Twenty-fourth Aspect

According to a twenty-fourth aspect of the invention, in the printing medium separation method of any one of the eighteenth to twenty-third aspects, when the blank amount of the predetermined printing area of the printing medium is of a predetermined value or smaller, any other printing area of the printing medium not yet through with the calculating of the blank amount is subjected to the extracting of the density information, the partitioning of the printing area, and the calculating of the blank amount, and the separating subjects the printing medium to the separation based on the result of the calculating.

This leads to effects and advantages similar to those of the printing medium separation device of the seventh aspect.

Twenty-fifth Aspect

According to a twenty-fifth aspect of the invention, in the printing medium separation method of any one of the eighteenth to twenty-fourth aspects, generating is further included for generating, based on the density information extracted by the extracting, area image data being image data for the printing area. In the printing medium separation method, the calculating calculates the blank amount for each of the partition areas based on the area image data of each of the partition areas being the results by the partitioning.

This leads to effects and advantages similar to those of the printing medium separation device of the eighth aspect.

Twenty-sixth Aspect

A twenty-sixth aspect of the invention is directed to a printing device, including: a density information extraction unit that extracts density information about a predetermined printing area of a printing medium for use to print an image; an area partition unit that partitions the printing area into a plurality of partition areas; a blank amount calculation unit that calculates, based on the density information about each of the partition areas being results of the partitioning by the area partition unit, a blank amount of each of the partition areas; a separation unit that subjects the printing medium to separation based on a result of calculating by the blank amount calculation unit; an image data acquisition unit that acquires image data of a printing object; a selection unit that makes a selection of the printing medium for execution of a printing job after the separation by the separation unit; and a printing unit that prints an image to the printing medium selected by the selection unit based on the image data acquired by the image data acquisition unit.

With such a configuration, the density information extraction unit can extract density information about a predetermined printing area of a printing medium for use to print an image.

The area partition unit can partition the printing area into a plurality of partition areas.

After the printing area is partitioned as such, the blank amount calculation unit can calculate, based on the density information extracted for each of the partition areas being results of partitioning by the area partition unit, the amount of a blank space of each of the partition areas. After the amount of a blank space is calculated as such, the separation unit can subject the printing medium to separation based on the calculation result.

When image data of a printing object is acquired by the image data acquisition unit after separation of printing media, the selection unit can select any one of the separated printing media for execution of a printing job. After the printing medium is selected, the printing unit can print an image to the selected printing medium based on the acquired image data.

As such, in addition to the effects and advantages similar to those of the printing medium separation apparatus of the first aspect, any separated printing medium such as one-side-blank paper can be reused for printing again so that the printing medium can be effectively used again.

Twenty-seventh Aspect

According to a twenty-seventh aspect of the invention, in the printing device of the twenty-sixth aspect, the printing medium is a printing paper, and the printing area is at least one of two surfaces of the printing paper.

With such a configuration, in addition to the effects and advantages similar to those of the printing medium separation apparatus of the second aspect, any separated printing medium such as one-side-blank paper can be reused for printing again so that the printing medium can be effectively used again.

Twenty-eighth Aspect

According to a twenty-eighth aspect of the invention, in the printing device of the twenty-sixth or twenty-seventh aspect, based on the blank amount calculated for each of the partition areas, the blank amount calculation unit determines whether each of the partition areas is blank or not, and based on a determination result, calculates a blank ratio for the printing area, and the separation unit subjects the printing medium to the separation based on the blank ratio being a result of calculating by the blank amount calculation unit.

With such a configuration, in addition to the effects and advantages similar to those of the printing medium separation apparatus of the third aspect, any separated printing medium such as one-side-blank paper can be reused for printing again so that the printing medium can be effectively used again.

Twenty-ninth Aspect

According to a twenty-ninth aspect of the invention, in the printing device of the twenty-eighth aspect, the blank amount calculation unit calculates a total number of the partition areas of an area in which two or more of the partition areas determined as being blank are located in a row, and based on the total number being a calculation result, calculates the blank ratio.

With such a configuration, in addition to the effects and advantages similar to those of the printing medium separation apparatus of the fourth aspect, any separated printing medium such as one-side-blank paper can be reused for printing again so that the printing medium can be effectively used again.

Thirtieth Aspect

According to a thirtieth aspect of the invention, in the printing device of any one of the twenty-sixth to twenty-ninth aspects, a blank image line counting unit is further included for counting, based on the density information about the predetermined printing area specifically for a plurality of image lines in a vertical direction and for a plurality of image lines in a lateral direction, for each of the directions, a number of blank image lines each configured by a pixel of a density value indicating a color of white. In the printing device, the area partition unit partitions, based on a result of counting by the blank image line counting unit, the predetermined printing area into the plurality of partition areas.

With such a configuration, in addition to the effects and advantages similar to those of the printing medium separation apparatus of the fifth aspect, any separated printing medium such as one-side-blank paper can be reused for printing again so that the printing medium can be effectively used again.

Thirty-first Aspect

According to a thirty-first aspect of the invention, in the printing device of the thirtieth aspect, the area partition unit repeatedly subjects each of the partition areas to the counting of the blank image lines by the blank image line counting unit, and based on the result of counting, to the partitioning by the area partition unit until the printing area is partitioned into a desired number of partition areas.

With such a configuration, in addition to the effects and advantages similar to those of the printing medium separation apparatus of the sixth aspect, any separated printing medium such as one-side-blank paper can be reused for printing again so that the printing medium can be effectively used again.

Thirty-second Aspect

According to a thirty-second aspect of the invention, in the printing device of any one of the twenty-sixth to thirty-first aspects, when the blank amount of the predetermined printing area of the printing medium is of a predetermined value or smaller, any other printing area of the printing medium not yet through with the calculating of the blank amount is subjected to the extracting of the density information, the partitioning of the printing area, and the calculating of the blank amount, and the separation unit subjects the printing medium to the separation based on the result of calculating the blank amount.

With such a configuration, in addition to the effects and advantages similar to those of the printing medium separation apparatus of the seventh aspect, any separated printing medium such as one-side-blank paper can be reused for printing again so that the printing medium can be effectively used again.

Thirty-third Aspect

According to a thirty-third aspect of the invention, in the printing device of any one of the twenty-sixth to thirty-second aspects, an image data generation unit is further included for generating, based on the density information extracted by the density information extraction unit, area image data being image data for the printing area. In the printing device, the blank amount calculation unit calculates the blank amount for each of the partition areas based on the area image data of each of the partition areas being the results of partitioning by the area partition unit.

With such a configuration, in addition to the effects and advantages similar to those of the printing medium separation apparatus of the eighth aspect, any separated printing medium such as one-side-blank paper can be reused for printing again so that the printing medium can be effectively used again.

Thirty-fourth Aspect

A thirty-fourth aspect of the invention is directed to a printing device control program for use for execution by a computer, including: extracting density information about a predetermined printing area of a printing medium for use to print an image; partitioning the predetermined printing area into a plurality of partition areas; calculating, based on the density information extracted for each of the partition areas being results by the partitioning, a blank amount of each of the partition areas; subjecting the printing medium to separation based on a result of the calculating; acquiring image data of a printing object; making a selection of the printing medium for execution of a printing job after the separating in the separating; and printing an image to the printing medium selected in the selecting based on the image data acquired in the acquiring.

With such a configuration, when the program is read by a computer, and when the computer starts executing processes in accordance with the program read as such, the effects and advantages similar to that of the printing device of the twenty-sixth aspect can be derived.

Thirty-fifth Aspect

According to a thirty-fifth aspect of the invention, in the printing device control program of the thirty-fourth aspect, the printing medium is a printing paper, and the printing area is at least one of two surfaces of the printing paper.

With such a configuration, when the program is read by a computer, and when the computer starts executing processes in accordance with the program read as such, the effects and advantages similar to those of the printing device of the twenty-seventh aspect can be derived.

Thirty-sixth Aspect

According to a thirty-sixth aspect of the invention, in the printing device control program of the thirty-fourth or thirty-fifth aspect, based on the blank amount calculated for each of the partition areas, the calculating determines whether each of the partition areas is blank or not, and based on a determination result, calculates a blank ratio for the printing area, and the separating subjects the printing medium to separation based on the blank ratio being a result of the calculating.

With such a configuration, when the program is read by a computer, and when the computer starts executing processes in accordance with the program read as such, the effects and advantages similar to those of the printing device of the twenty-eighth aspect can be derived.

Thirty-seventh Aspect

According to a thirty-seventh aspect of the invention, in the printing device control program of the thirty-sixth aspect, the calculating calculates a total number of the partition areas of an area in which two or more of the partition areas determined as being blank are located in a row, and based on the total number being a calculation result, calculates the blank ratio.

With such a configuration, when the program is read by a computer, and when the computer starts executing processes in accordance with the program read as such, the effects and advantages similar to those of the printing device of the twenty-ninth aspect can be derived.

Thirty-eighth Aspect

According to a thirty-eighth aspect of the invention, in the printing device control program of any one of the thirty-fourth to thirty-seventh aspects, for use for execution by a computer, a program is further included for counting, based on the density information about the predetermined printing area specifically for a plurality of image lines in a vertical direction and for a plurality of image lines in a lateral direction, for each of the directions, a number of blank image lines each configured by a pixel of a density value indicating a color of white. In the printing device control program, the partitioning is included for partitioning, based on a result of the counting, the predetermined printing area into the plurality of partition areas.

With such a configuration, when the program is read by a computer, and when the computer starts executing processes in accordance with the program read as such, the effects and advantages similar to those of the printing device of the thirtieth aspect can be derived.

Thirty-ninth Aspect

According to a thirty-ninth aspect of the invention, in the printing device control program of the thirty-eighth aspect, the partitioning repeatedly subjects each of the partition areas to the counting of the blank image lines by the counting, and based on the result of the counting, to the partitioning until the printing area is partitioned into a desired number of partition areas.

With such a configuration, when the program is read by a computer, and when the computer starts executing processes in accordance with the program read as such, the effects and advantages similar to those of the printing device of the thirty-first aspect can be derived.

Fortieth Aspect

According to a fortieth aspect of the invention, in the printing device control program of any one of the thirty-fourth to thirty-ninth aspects, when the blank amount of the predetermined printing area of the printing medium is of a predetermined value or smaller, any other printing area of the printing medium not yet through with the calculating of the blank amount is subjected to the extracting of the density information, the partitioning of the printing area, and the calculating of the blank amount, and the separating subjects the printing medium to the separation based on the result of the calculating.

With such a configuration, when the program is read by a computer, and when the computer starts executing processes in accordance with the program read as such, the effects and advantages similar to those of the printing device of the thirty-second aspect can be derived.

Forty-first Aspect

According to a forty-first aspect of the invention, in the printing device control program of any one of the thirty-fourth to fortieth aspects, for use for execution by a computer, a program is further included for generating, based on the density information extracted by the extracting, area image data being image data for the printing area. In the printing device control program, the calculating calculates the blank amount for each of the partition areas based on the area image data of each of the partition areas being the results by the partitioning.

With such a configuration, when the program is read by a computer, and when the computer starts executing processes in accordance with the program read as such, the effects and advantages similar to those of the printing device of the thirty-third aspect can be derived.

Forty-second Aspect

A forty-second aspect of the invention is directed to a computer-readable storage medium storing therein the printing device control program of any one of the thirty-fourth to forty-first aspects.

This enables easy and reliable provision of the printing device control program of any one of the thirty-fourth to forty-first aspects to a user or others via a computer-readable storage medium such as CD-ROMs, DVD-ROMs, FDs, and semiconductor chips.

Forty-third Aspect

A forty-third aspect of the invention is directed to a printing device control method, including: extracting density information about a predetermined printing area of a printing medium for use to print an image; partitioning the printing area into a plurality of partition areas; calculating, based on the density information extracted for each of the partition areas being results by the partitioning, a blank amount of each of the partition areas; subjecting the printing medium to separation based on a result of the calculating; acquiring image data of a printing object; making a selection of the printing medium for execution of a printing job after the separating in the separating; and printing an image to the printing medium selected in the selecting based on the image data acquired in the acquiring.

This leads to effects and advantages similar to those of the printing device of the twenty-sixth aspect.

Forty-fourth Aspect

According to a forty-fourth aspect of the invention, in the printing device control method of the forty-third aspect, the printing medium is a printing paper, and the printing area is at least one of two surfaces of the printing paper.

This leads to effects and advantages similar to those of the printing device of the twenty-seventh aspect.

Forty-fifth Aspect

According to a forty-fifth aspect of the invention, in the printing device control method of the forty-third or forty-fourth aspect, based on the blank amount calculated for each of the partition areas, the calculating determines whether each of the partition areas is blank or not, and based on a determination result, calculates a blank ratio for the printing area, and the separating subjects the printing medium to the separation based on the blank ratio being a result of the calculating.

This leads to effects and advantages similar to those of the printing device of the twenty-eighth aspect.

Forty-sixth Aspect

According to a forty-sixth aspect of the invention, in the printing device control method of the forty-fifth aspect, the calculating calculates a total number of the partition areas of an area in which two or more of the partition areas determined as being blank are located in a row, and based on the total number being a calculation result, calculates the blank ratio.

This leads to effects and advantages similar to those of the printing device of the twenty-ninth aspect.

Forty-seventh Aspect

According to a forty-seventh aspect of the invention, in the printing device control method of any one of the forty-third to forty-sixth aspects, counting is further included for counting, based on the density information about the predetermined printing area specifically for a plurality of image lines in a vertical direction and for a plurality of image lines in a lateral direction, for each of the directions, a number of blank image lines each configured by a pixel of a density value indicating a color of white. In the printing device control method, the partitioning partitions, based on a result of the counting, the predetermined printing area into the plurality of partition areas.

This leads to effects and advantages similar to those of the printing device of the thirtieth aspect.

Forty-eighth Aspect

According to a forty-eighth aspect of the invention, in the printing device control method of the forty-seventh aspect, the partitioning repeatedly subjects each of the partition areas to the counting of the blank image lines by the counting, and based on the result of the counting, to the partitioning by the partition until the printing area is partitioned into a desired number of partition areas.

This leads to effects and advantages similar to those of the printing of the thirty-first aspect.

Forty-ninth Aspect

According to a forty-ninth aspect of the invention, in the printing device control method of any one of the forty-third to forty-eighth aspects, when the blank amount of the predetermined printing area of the printing medium is of a predetermined value or smaller, any other printing area of the printing medium not yet through with the calculating of the blank amount is subjected to the extracting of the density information, the partitioning of the printing area, and the calculating of the blank amount, and the separating subjects the printing medium to the separation based on the result of the calculating.

This leads to effects and advantages similar to those of the printing device of the thirty-second aspect.

Fiftieth Aspect

According to a fiftieth aspect of the invention, in the printing device control method of any one of the forty-third to forty-ninth aspects, generating is further included for generating, based on the density information extracted by the extracting, area image data being image data for the printing area. In the printing device, the calculating calculates the blank amount for each of the partition areas based on the area image data of each of the partition areas being the results by the partitioning.

This leads to effects and advantages similar to those of the printing device of the thirty-third aspect.

BRIEF DESCRIPTION OF THE DRAWINGS

The invention will be described with reference to the accompanying drawings, wherein like numbers reference like elements.

FIG. 7 is a diagram showing the relationship between the ranges of a blank ratio and trays being separation destinations.

FIG. 12 is a diagram showing the relationship among coordinates information of each of the partition areas being the results of partitioning, information indicating whether the area is blank or not, and information about the proximity of the partition areas.

FIG. 15 is a diagram showing document separation trays by type for separation by a document separation section 20 of the printing device 200 in the third embodiment of the invention.

FIGS. 16A and 16B are each a diagram showing exemplary image printing to a blank space of a paper with a blank ratio being smaller than 100[%].

DESCRIPTION OF EXEMPLARY EMBODIMENTS

First Embodiment

In the below, embodiments of the invention are described by referring to the accompanying drawings. FIGS. 1 to 8E are diagrams showing a first embodiment of the invention, i.e., a printing medium separation apparatus, a printing medium separation program, a storage medium storing therein the program, and a printing medium separation method.

Figure 1:
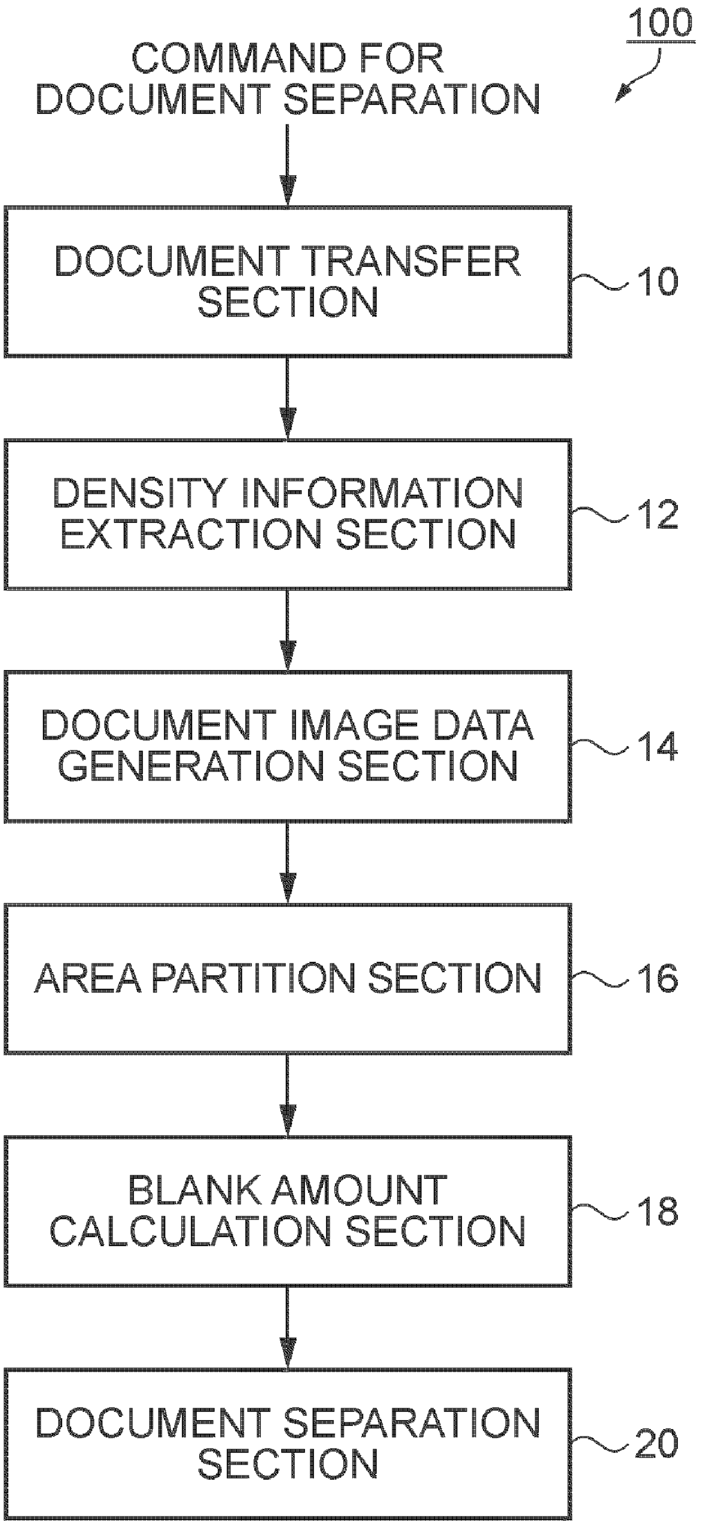
FIG. 1 is a block diagram showing the configuration of a printing medium separation apparatus 100 of a first embodiment of the invention.

Described first is the configuration of a printing medium separation apparatus of the first embodiment of the invention by referring to FIG. 1. FIG. 1 is a block diagram showing the configuration of a printing medium separation apparatus 100 of the first embodiment of the invention.

As shown in FIG. 1, the printing medium separation apparatus 100 is configured to include a document transfer section 10, a density information extraction section 12, a document image data generation section 14, an area partition section 16, a blank amount calculation section 18, and a document separation section 20. The document transfer section 10 serves to transfer a document, i.e., paper, set on a transfer tray to a density extraction area, which will be described later. The density information extraction section 12 serves to extract density information about the document, i.e., the entire surface thereof, having reached the density extraction area. The document image data generation section 14 serves to generate image data for the surface of the document (hereinafter, referred to as document image data) based on the extracted density information. The area partition section 16 serves to partition a document image into a plurality of partition areas based on the document image data. The blank amount calculation section 18 serves to calculate the amount of a blank space for each of the partition areas, and calculate a blank ratio of the document image based on the blank amount calculated as such. The document separation section 20 serves to perform document separation based on the blank ratio calculated as such.

Similarly to any known ADF (Auto Document Feeder), the document transfer section 10 includes a transfer tray on which a plurality of documents can be set all at once. The document transfer section 10 has a function of transferring, one by one, the documents set on the transfer tray to a density extraction area (not shown) of the density information extraction section 12.

The density information extraction section 12 has a density information extraction area, and has a function of extracting, with a predetermined resolution, the density of the surface of the document having reached the density information extraction area. For extraction of the density information, used is the principle similar to any known scanner and any known color densitometer, for example. In this embodiment, similarly to any known scanner, the density information extraction section 12 has a function of extracting the density information by irradiating lights to a printing image, and receiving the reflected lights by a light receiving element, e.g., CCD (Charge-Coupled Device).

The document image data generation section 14 has a function of generating document image data for the surface of the document based on the density information of the predetermined resolution extracted by the density information extraction section 12. The document image data is image data of a predetermined resolution. To be specific, the document image data generation section 14 binarizes the density information, i.e., density value or brightness value, based on a binary threshold value for every pixel, and removes any component of the underside image of the document. The resulting document image data has either a value of "1" or "0" depending on the document being white or not, i.e., "1" if the document is white, and "0" if the document is not white.

Herein, the term of "any component of the underside image" denotes a phenomenon of reading, when a scanner scans the surface of a document, also the density information about any image, i.e., especially image with higher density, printed on the underside of the document. Due to such a phenomenon, in a copier or others, for example, the copying result of the surface of the document may include a part of the printing details of the underside of the document.

The area partition section 16 has a function of partitioning a document image into a plurality of partition areas based on the document image data. In this embodiment, based on the predetermined partition number, a document image is partitioned into the partition number of rectangular-shaped images of a uniform size. Specifically, the document image data is partitioned into groups of image data for each of the partition areas.

The blank amount calculation section 18 has a function of calculating the amount of a blank space for each of the partition areas based on the document image data of each of the partition areas, and calculating the amount of a blank space for the document image based on the amount of the blank space calculated for each of the partition areas. In this embodiment, based on the amount of a blank space of each of the partition areas, a determination is made whether the partition areas are each a blank space or not, and based on the determination result, the number of the blank spaces is calculated with respect to the entire number of the partition areas. The calculation result is the blank ratio of the document image.

The document separation section 20 includes a document separation tray for every predetermined range of a blank ratio, and the separation tray is varying in type. The document separation section 20 has a function of transferring, i.e., separating, the document into any of the document separation trays based on the blank ratio being the calculation result of the blank amount calculation section 18.

Figure 2:
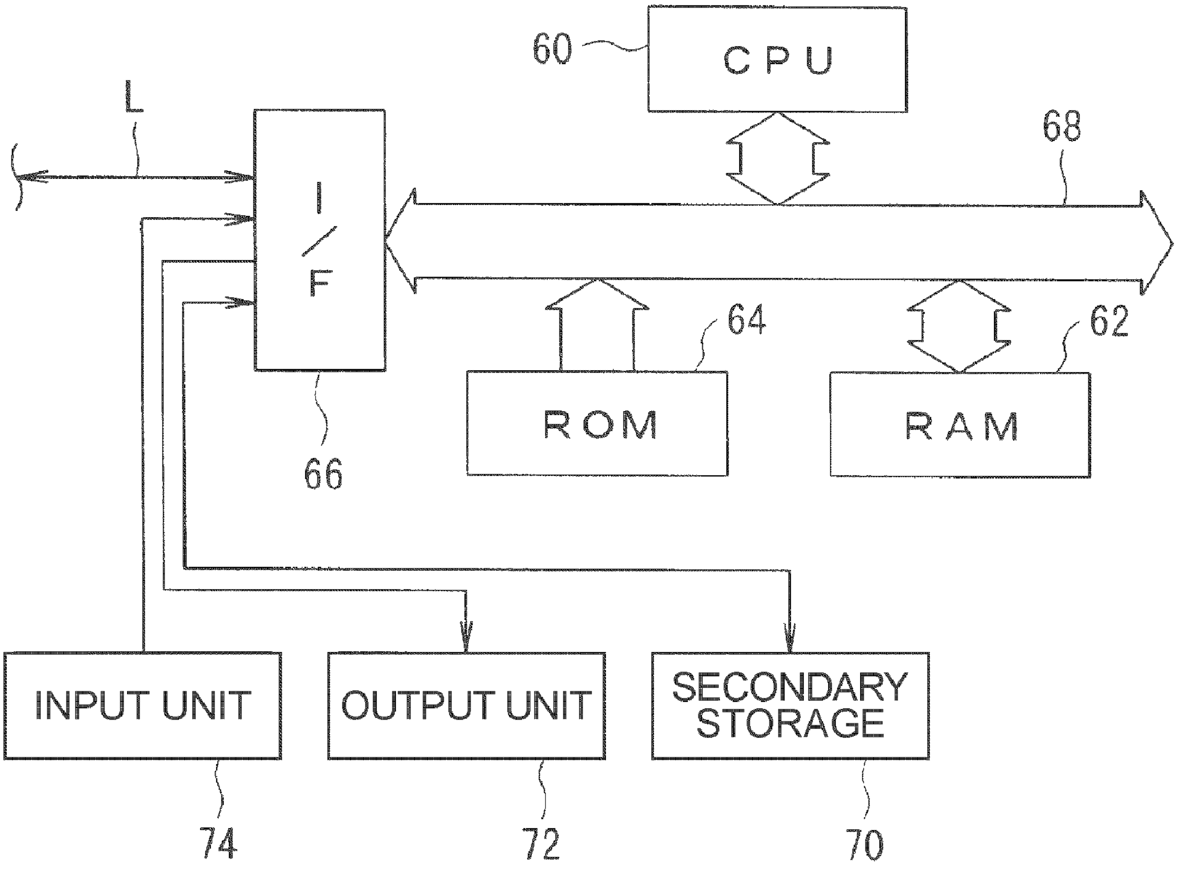
FIG. 2 is a block diagram showing the hardware configuration of the printing medium separation apparatus 100 or a printing device 200 of the first embodiment of the invention.

Herein, the printing medium separation apparatus 100 is configured to include a computer system for application of various types of control for document separation, and for implementation of the components on software, i.e., the document transfer section 10, the density information extraction section 12, the document image data generation section 14, the area partition section 16, the blank amount calculation section 18, the document separation section 20, and others. As shown in FIG. 2, in the hardware configuration, an In/Out bus 68 varying in type, e.g., a PCI (Peripheral Component Interconnect) bus, or an ISA (Industrial Standard Architecture) bus is connecting a CPU (Central Processing Unit) 60, a RAM (Random Access Memory) 62, and a ROM (Read Only Memory) 64. The CPU 60 takes charge of control application varying in type and computation processes, the RAM 62 is configuring a main storage, and the ROM 64 is a storage device only for data reading. This bus 68 is connected with, via an input/output interface (I/F) 66, a secondary storage 70 such as HDD (Hard Disk Drive), an output unit 72 such as LCD (Liquid Crystal Display) monitor, an input unit 74 such as operation panel, and others.

When the printing medium separation apparatus 100 is turned on, a system program, e.g., BIOS (Basic Input Output System), stored in the ROM 64 or others loads any specific computer programs varying in type into the RAM 62. The computer programs are those stored in the ROM 64 in advance, or those installed to the secondary storage 70 via a storage medium such as CD-ROM (Compact Disk Read-Only Memory) or DVD-ROM (Digital Versatile Disc Read-Only Memory), or over a communications network L such as the Internet. In accordance with commands written in the program loaded into the RAM 62 as such, the CPU 60 applies any predetermined control and performs any predetermined computation process by using various types of resources so that the functions described above for the components can be implemented on the software.

By referring to FIG. 3, described next is the operation flow for the printing medium separation apparatus 100 configured as above. Herein, FIG. 3 is an operation flowchart for the printing medium separation apparatus 100.

Figure 3:
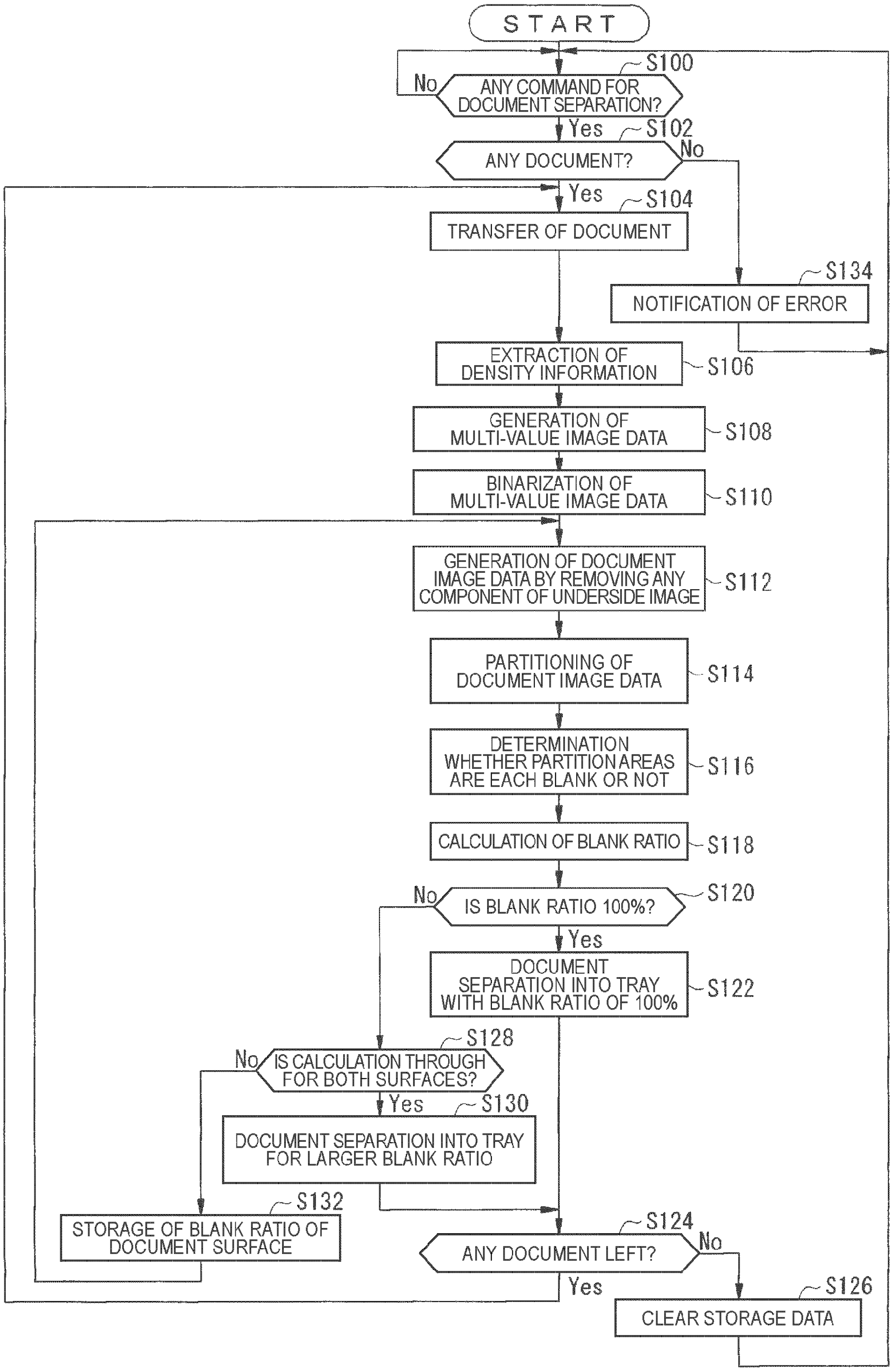
FIG. 3 is an operation flowchart for the printing medium separation apparatus 100.

As shown in FIG. 3, the procedure first goes to step S100, and the document transfer section 10 makes a determination whether or not there is a command of document separation, i.e., document transfer command. When the determination result is Yes, the procedure goes to step S102, and if No, the determination process is repeated until such a command comes.

In step S102, based on an output of a sensor (not shown), the document transfer section 10 determines whether there is any document set on the transfer tray. When the determination result is Yes, the procedure goes to step S104, and if No, the procedure goes to step S134.

In step S104, the document transfer section 10 transfers one of the documents set on the transfer tray to a density information extraction area (not shown) of the density information extraction section 12, and the procedure then goes to step S106.

In step S106, the density information extraction section 12 extracts the density information with a predetermined resolution that has been set in advance, and the procedure goes to step S108. The density information is of the density extraction surface of the document having reached the density information extraction area, i.e., the surface of the document in its entirety. Such extraction of the density information is performed to both surfaces of the document. The surface firstly subjected to extraction of the density information is regarded as the surface of the document, and the surface secondly subjected to extraction is regarded as the underside of the document. That is, after completion of extraction with respect to the surface of the document, the document is turned inside out for extraction of the density information from the underside of the document this time. Note that the density information of the underside of the document is used for removing any component of the surface image, and the density information of the surface of the document is used for removing any component of the underside image.

In step S108, the document image data generation section 14 generates image data based on the density information extracted in step S106, and the procedure goes to step S110. The image data is the one configured by various density values of the density information, and is hereinafter referred to as multi-value image data. Such generation of multi-value image data is firstly applied to the surface of the document.

In step S110, the document image data generation section 14 generates image data by binarizing the multi-value image data generated in step S108, and the procedure then goes to step S112. Such data generation is performed based on a threshold value that has been set in advance for binarization, and the resulting image data is hereinafter referred to as binary image data.

In step S112, the document image data generation section 14 generates image data free from any component of the underside image, and the procedure then goes to step S114. The component of the underside image is the one often observed at the time of scanning of any document printed with images on the underside, and the resulting data is referred to as document image data. Herein, to remove such component of the underside image, for example, the technique found in JP-A-5-22572 may be used, i.e., the binary image data of the underside of the document is horizontally inverted, and a coefficient is multiplied thereto. The multiplication result is then deducted from the binary image data of the surface of the document (remove any component of the surface image in this case).

In step S114, in the area partition section 16, the document image data generated in step S112 is partitioned into a plurality of partition areas, i.e., data areas, and the procedure then goes to step S116.

In step S116, the blank amount calculation section 18 calculates the amount of a blank space for each of the partition areas, and based on the calculated amounts of a blank space, determines whether each of the partition areas is blank or not. The procedure then goes to step S118. Assuming that every pixel of a partition area takes a value of "225", the partition area is determined as being the blank space, and if not, the partition area is determined as not being the blank space.

In step S118, based on the determination result in step S116, the blank amount calculation section 18 calculates a blank ratio for the document image, and the procedure goes to step S120. Herein, the blank ratio is calculated by "(W/D)×100[%]" where D denotes the number of partition areas, and W denotes the number of the blank spaces. Note here that if the partition number is increased to some degree, the partition areas are reduced in area. Therefore, when the partition number is a predetermined number or larger, e.g., 16 or larger, the blank ratio is calculated in consideration of the state of the blank spaces, i.e., whether the blank spaces are located in a row (whether being proximal or not). Specifically, in this embodiment, any blank space being away from others is determined as not available for recycle use.

The blank ratio in this case is thus calculated as "((W−S)/D)×100[%]" where S denotes the number of blank spaces being away from others.

In step S120, the document separation section 20 determines whether the blank ratio calculated in step S118 is 100[%] or not. When the determination result is Yes, the procedure goes to step S122, and if No, the procedure goes to step S128.

In step S122, the document separation section 20 transfers any document found in the density information extraction area to the document separation tray for those with the blank ratio of 100[%] so that the document is separated. The procedure then goes to step S124.

In step S124, the document transfer section 10 determines whether there is any document left on the transfer tray. When the determination result is Yes, the procedure returns to step S104, and if No, the procedure goes to step S126.

In step S126, any stored data about the blank ratio for the surfaces of the documents is cleared, and the procedure returns to step S100.

In step S120, when the procedure goes to step S128 because the blank ratio is not 100[%], the document separation section 20 determines whether both surfaces of the document are through with calculation of the blank ratio. When the determination result is Yes, the procedure goes to step S130, and if No, the procedure goes to step S132.

In step S130, the document separation section 20 compares the surface of the document and the underside thereof in terms of the blank ratio based on the data about the blank ratio stored in the RAM 62 or the secondary storage 70 for the surface of the document. The document separation section 20 separates the document found in the density information extraction area to the document separation tray for the higher blank ratio. The procedure then returns to step S124.

In step S128, when the procedure goes to step S132 because the calculation of a blank ratio is not yet done for both surfaces of the document, the document separation section 20 stores the blank ratio of the surface of the document into either the RAM 62 or the secondary storage 70. The procedure then returns to step S112. That is, the blank ratio of the surface of the document is stored and retained, and the underside of the document is subjected to the processes starting from generation of document image data.

In step S102, when the procedure goes to step S134 because there is no document on the transfer tray, error information is forwarded to (displayed on) the output unit 72, e.g., liquid crystal display section, so that error notification is made. The error information is a message or others indicating that no document is set, for example. The procedure then returns to step S100.

Figure 4:
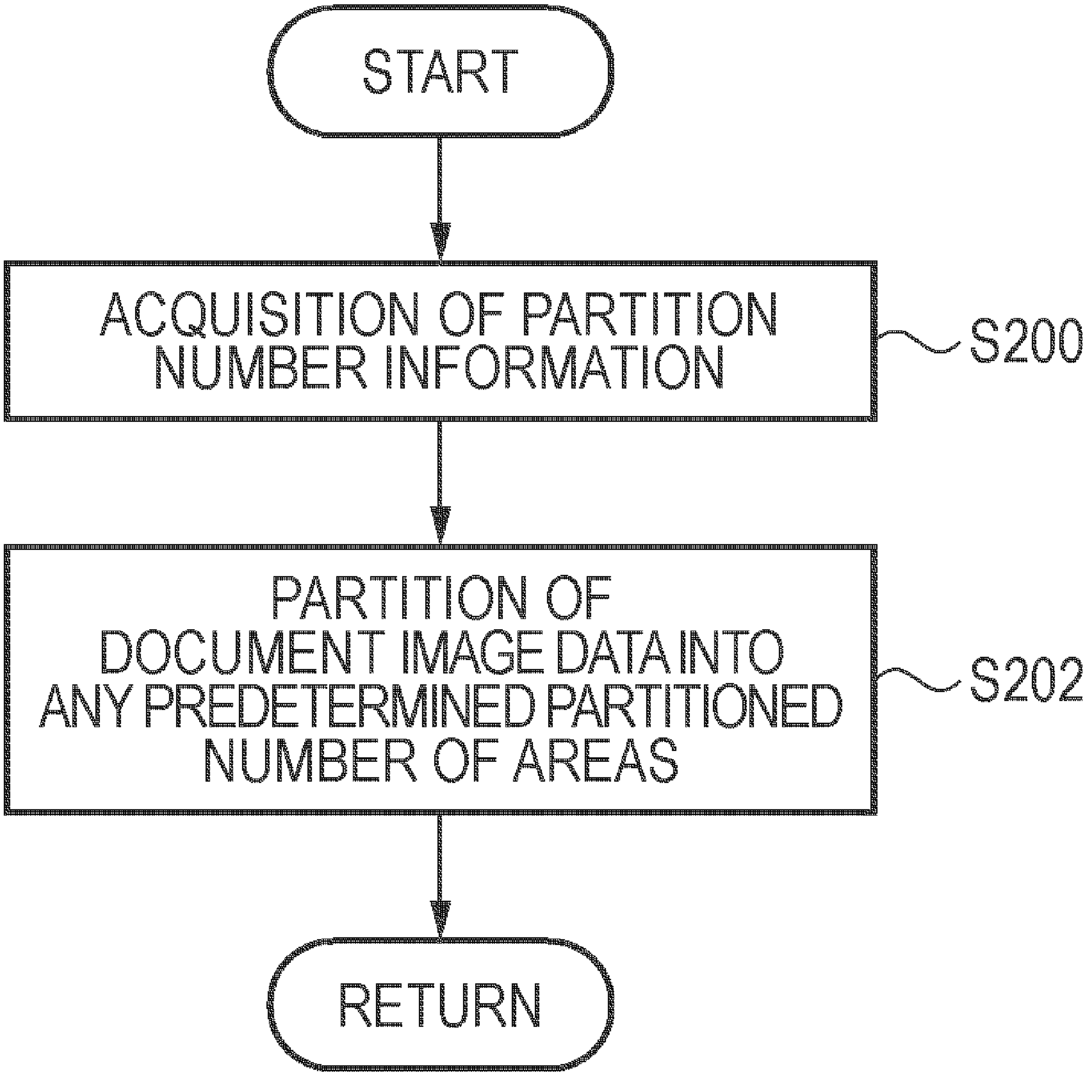
FIG. 4 is a flowchart of partitioning document image data by an area partition section 16.

By referring to FIG. 4, described next is the process flow of partitioning document image data in the area partition section 16. FIG. 4 is the flowchart of partitioning document image data in the area partition section 16.

As shown in FIG. 4, for partitioning of document image data, the procedure first goes to step S200, and partition number information is acquired in the area partition section 16. The procedure then goes to step S202. Herein, the partition number information to be acquired may be the one previously set or input by a user, or the user may select any one of a plurality of partition numbers.

In step S202, the area partition section 16 partitions the document image into partition areas of a uniform size. The number of the partition areas is the one designated by the partition number information acquired in step S200. This is the end of the process, and the procedure returns to the original process. Specifically, every pixel data of the document image data is partitioned in such a manner that the document image of the document image data is partitioned into the partition number of rectangular-shaped image areas of a uniform size.

By referring to FIGS. 5 to 8E, described next is the operation of the printing medium separation apparatus 100 of the embodiment.

Figure 5:
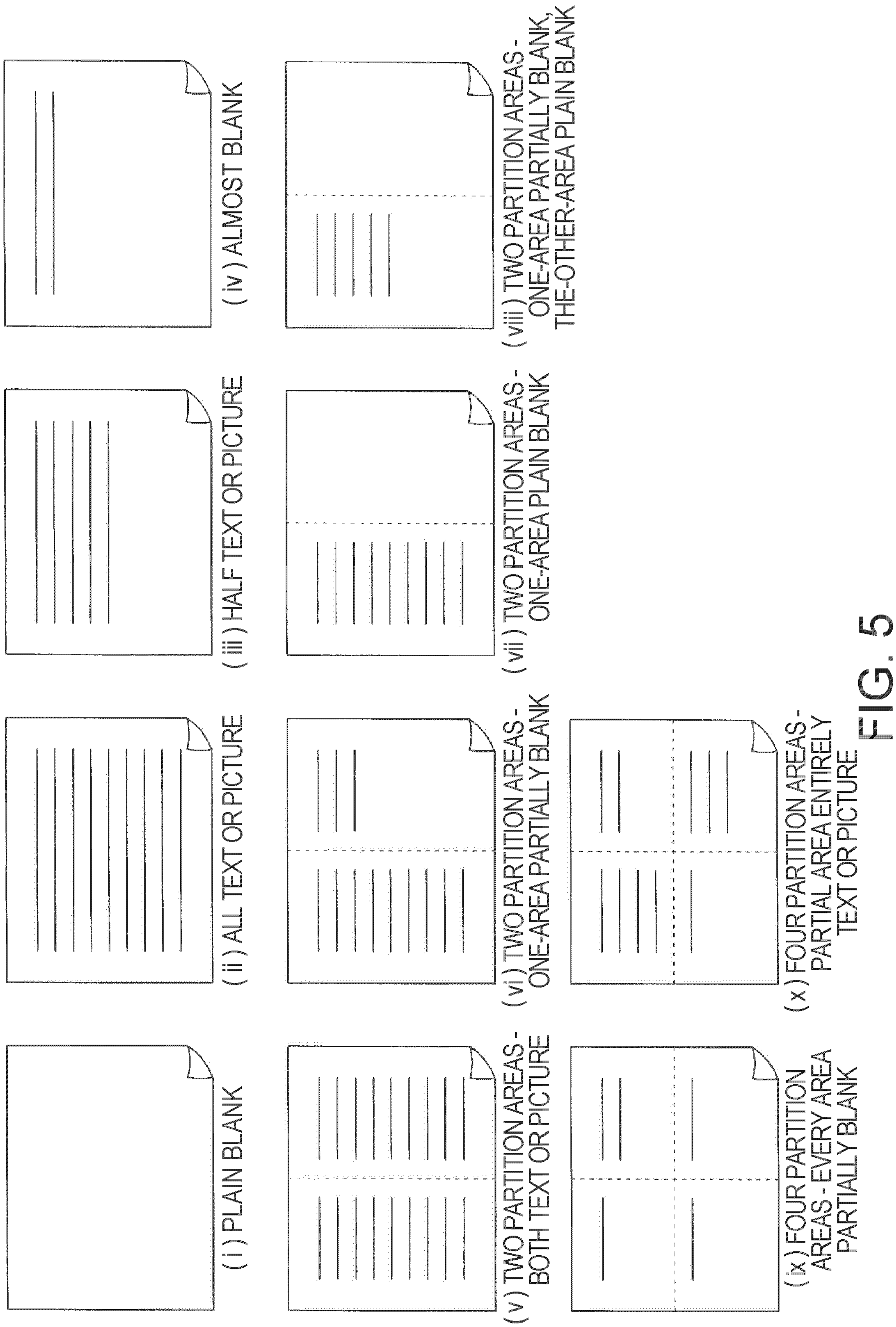
FIG. 5 is a diagram showing an exemplary document, i.e., i shows an exemplary document being plain white, and ii to X each show an exemplary document printed with images.
Figure 6:
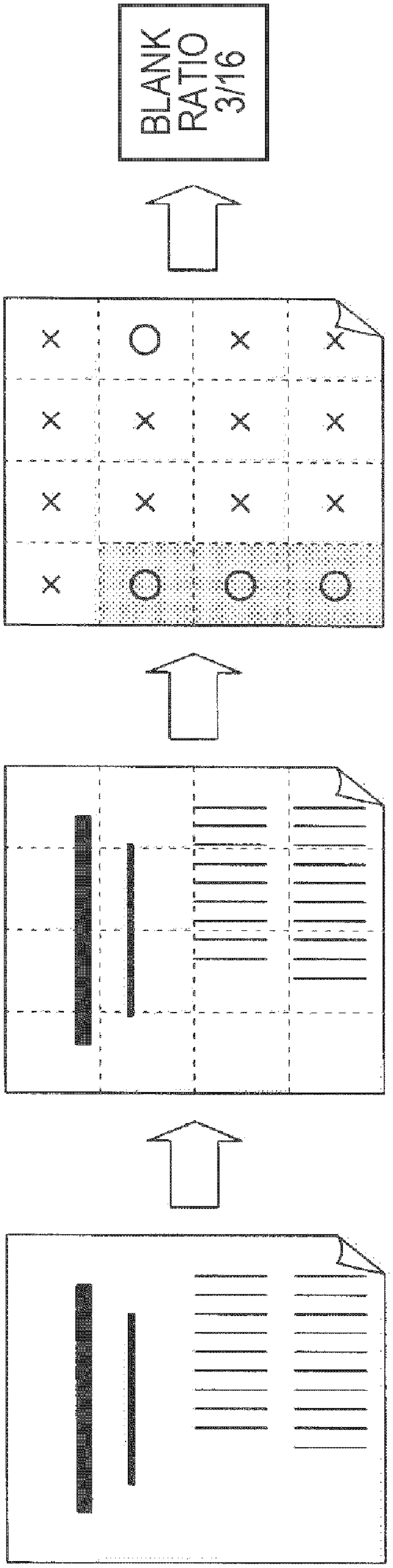
FIG. 6 is a diagram showing an exemplary process flow when document image data is partitioned into 16 partition areas of a uniform size.

In FIG. 5, i shows an exemplary document being plain white, and ii to X each show an exemplary document printed with images on the paper surface. FIG. 6 is a diagram showing an exemplary process flow when document image data is partitioned into 16 partition areas of a uniform size. FIG. 7 is a diagram showing the relationship between the ranges of a blank ratio and trays being separation destinations. FIG. 8A to 8E are each a diagram showing an exemplary document to be separated into any corresponding document separation tray and a blank ratio thereof.

First of all, a user sets a plurality of documents on the transfer tray of the document transfer section 10. The documents include, for example, the document of i in FIG. 5, i.e., document at least one side is blank, and documents of ii to X, i.e., documents variously printed with images. These documents are those no longer needed as are through with their original roles or are failure results of printing, for example, and include those still available for recycle use of their blank spaces and those no more available for recycle use, e.g., like V of FIG. 5, the substantially entire surface thereof is printed with images.

The documents for setting on the transfer tray may be those printed with images only on one side or those printed with images on both sides, i.e., already used for recycle purpose. However, the printing medium separation apparatus 100 of the embodiment of the invention serves especially well for both-side-printed documents.

When a separation command comes through user operation of the input unit 74 (step S100), in the printing medium separation apparatus 100, the document transfer section 10 determines whether the transfer tray carries thereon any document (step S102). As described in the foregoing, because the transfer tray carries thereon a plurality of documents, the document transfer section 10 determines that the tray carries thereon some documents (branch of "Yes" in step S102). The document transfer section 10 then selects one of the documents set on the transfer tray, e.g., the document at the top or at the bottom from those piled on the transfer tray, and transfers the document to the density information extraction area of the density information extraction section 12.

After the document is transferred to the density information extraction area as such, the density information extraction section 12 extracts the density information about the document on the entire surface for the density extraction side (step S106). Specifically, the paper surface is entirely exposed to lights so as to derive a resolution of a predetermined level therefor, e.g., 1440 [dpi], and the reflected lights are received by a light receiving element, e.g., CCD, for photoelectric conversion, whereby the density information is extracted. This extraction of density information is performed to both surfaces of the document, i.e., the surface and the underside.

After extraction of the density information about the surface of the document and the underside thereof, based on the extracted density information, the document image data generation section 14 generates multi-value image data for images printed on the surface of the document and those for the underside thereof (step S108). In this example, the extracted density information, i.e., analog density value, is converted into a digital density value represented by 8 bits (256 levels of gray scale) thereby generating multi-value image data with 256 density values.

Thereafter, the density value of each of the pixels in the multi-value pixel data is compared with a predetermined threshold value, e.g., 15. When the density value is equal to or smaller than the predetermined threshold value, the value is changed to "1". When the density value is larger than the predetermined threshold value, the value is changed to "0". That is, the multi-value image data of the images printed on the surface is binarized, and binary image data is generated for both the surface and underside of the document (step S110).

The binary image data generated for the underside of the document is horizontally inverted, and a previously-provided coefficient is multiplied thereto. The multiplication result is deducted from the binary image data generated for the surface of the document so that any component of the underside image is removed from the image data of the surface of the document. In this manner, the document image data is generated (step S112). That is, the document image data is the binary image data being free from any component of the underside image. The binary image data is the one derived by binarizing the multi-value image data generated from the density information extracted from the surface of the document.

After the document image data is generated as such, the area partition section 16 starts partitioning of the generated document image data (step S114).

Once partitioning of the document image data is started as such, the image partition section 16 acquires partition number information (step S200). In this embodiment, the area partition section 16 is allowed to acquire any preset partition number information stored in the secondary storage 70, any value input by a user through operation of the input unit 74 and any partition number information selected by a user from others those set and stored in advance in the secondary device 70. Exemplified here is a case where the acquired partition number information indicates the partition number of 16.

After the partition number information is acquired as such, the document image data is partitioned into the partition number of areas designated by the partition number information (step S202). As an example, the document image of the left side of FIG. 6 is partitioned into 16 rectangular-shaped partition areas of a uniform size as the drawing at the center of FIG. 6. Note here that, in the drawing at the center of FIG. 6, the dotted lines partitioning the area are virtual partition lines, and with practical partitioning, virtual partition lines are set to a document image, and the document image data is classified into groups of image data for each partition area being the partition results by the partition lines.

After the document image data is partitioned as such, the blank amount calculation section 18 calculates the amount of a blank space for each of the partition areas, and based on the amounts of the blank space, determines whether each of the partition areas is blank or not (step S116). The amount of a blank space is represented by how many pixel values of "255" are observed in the image data of each of the partition areas. That is, a determination is sequentially made to every pixel value whether it is "255", and when there is a pixel value of "255", the counting number is incremented by 1. If with an image with 6000 pixels in the lateral direction and 8000 pixels in the vertical direction, when the image is partitioned into 16 partition areas of a uniform size, for example, each of the partition areas will have three million pixels. That is, if such three million pixels each have a pixel value of "255", the partition area is determined as being blank, and if not, the partition area is determined as not being blank.

Such a process of blank space determination is applied to every partition area so that every partition area can be identified as being blank, i.e., "○" in the right drawing of FIG. 6 or as not being a blank space, i.e., "×" in the same drawing of FIG. 6. Based on such determination results, the blank amount calculation section 18 calculates a blank ratio (step S118).

In this example, because the partition number is 16 and the partition areas are thus each relatively small, the blank ratio is calculated considering whether the blank spaces are located in a row or not. That is, the blank ratio is calculated by the equation of $((W-S)/D)\times100[\%]$. As shown in the right drawing of FIG. 6, there are four blank spaces, and three of these blank spaces located at the left are in a row in the vertical direction and the remaining blank space at the right is located away from these three. As such, with such FIG. 6 example of the right drawing, the blank ratio is calculated by $((4-1)/16)\times100[\%]\cong19[\%]$ where W=4, S=1, and D=16 . In this example, the fractional portion of the number is rounded off.

After the blank ratio is calculated for the surface of the document, the document separation section 20 determines whether the calculated blank ratio is 100[%] or not (step S120). In FIG. 6 example of the right drawing, because the blank ratio is 19[%] (branch of "No" in step S120) and the blank ratio is calculated only for the surface of the document (branch of "No" in step S128) the blank ratio of 19[%] calculated for the surface of the document is stored in the RAM 62 (step S132). After the blank ratio for the surface of the document is stored as such, the document image data generation section 14 removes any component of the underside image of the binary image data generated for the underside of the document so that the document image data is generated for the underside of the document (step S112). To remove any component of the underside image, the binary data for the surface of the document is horizontally inverted, and a preset coefficient is multiplied thereto. The multiplication result is then deducted from the binary image data generated for the underside of the document.

The document image data generated as such for the underside of the document is subjected to the processes of steps S114 to S120 similarly to the document image data generated for the surface of the document. When the underside of the document has the blank ratio of 100[%], the document is separated into a document separation tray for those with the blank ratio of 100[%]. In this embodiment, as shown in FIG. 7, the document separation tray is configured to include five trays of 1 to 5 for every range of a blank ratio. The tray 1 is for any document with the blank ratio of 100[%], and thus the document separation section 20 transfers the document whose underside is showing the blank ratio of 100[%] to the tray 1 (step S122). On the other hand, when the underside of the document is not showing the blank ratio of 100[%] (branch of "No" in step S120), the blank ratio is compared with the blank ratio of the surface of the document stored in the RAM 62, i.e., 19[%], and the document is transferred to any of the trays for documents with a larger blank ratio (step S130). When the underside of the document is showing the blank ratio of 65[%], for example, as shown in FIG. 7, the document is transferred to the tray 2 corresponding to the blank ratio of 65[%]. Note that, because the surface of the document is showing the blank ratio of 19[%] in this example, even if the underside of the document is showing the blank ratio smaller than 19[%], as shown in FIG. 7, any document with the blank ratio being in the range from 0 to 19% is all transferred to the tray 5.

After the document separation is completed by the document separation section 20, the document transfer section 10 determines whether there is any document left on the transfer tray (step S124). When there is some documents left on the transfer tray (branch of "Yes" in step S124), the document transfer section 10 selects one of the documents left on the transfer tray for transfer to the density information extraction area, and the sequence of the processes, i.e., steps S106 to S132, is executed. On the other hand, when there is no document left on the transfer tray (branch of "No" in step S124), the data about the blank ratios stored in the RAM 62 is completely cleared, and this is the end of the procedure (the procedure returns to step S100).

Figure 8A:
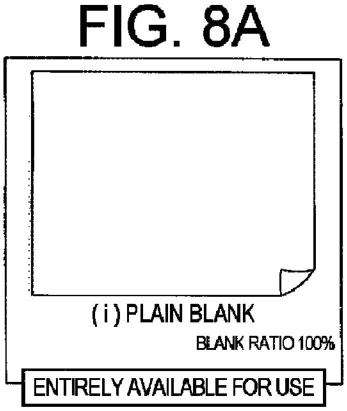
FIG. 8A to 8E are each a diagram showing an exemplary document to be separated into any corresponding document separation tray and a blank ratio thereof.
Figure 8B:
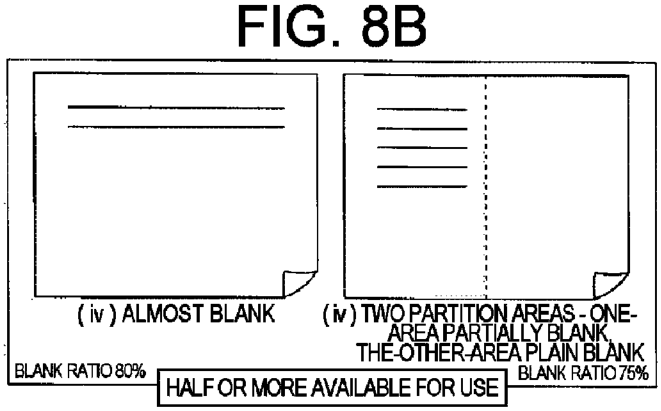
Figure 8C:
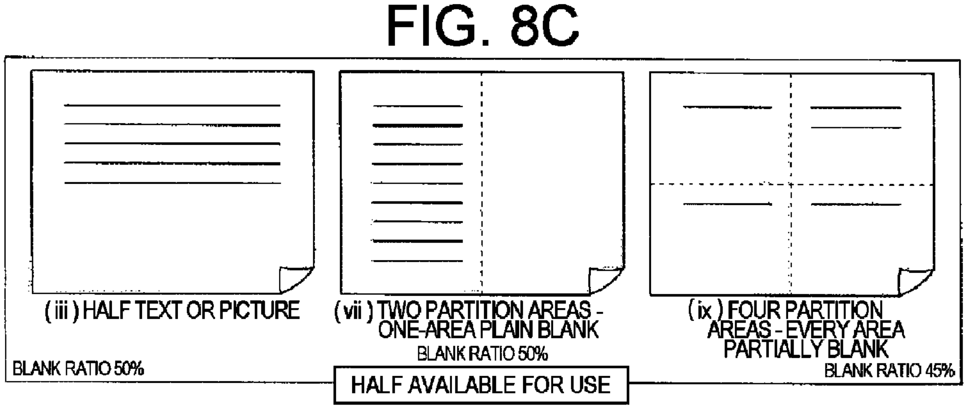
Figure 8D:
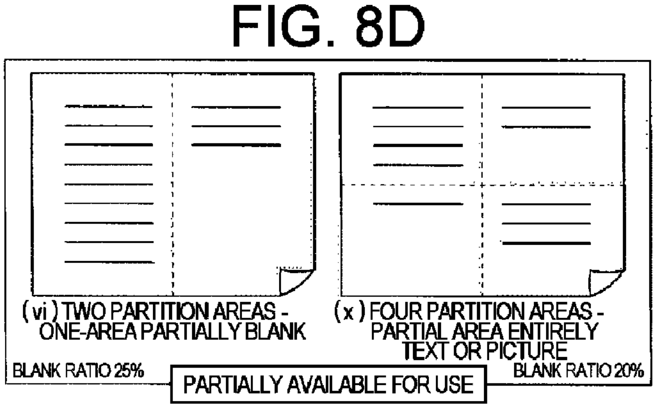
Figure 8E:
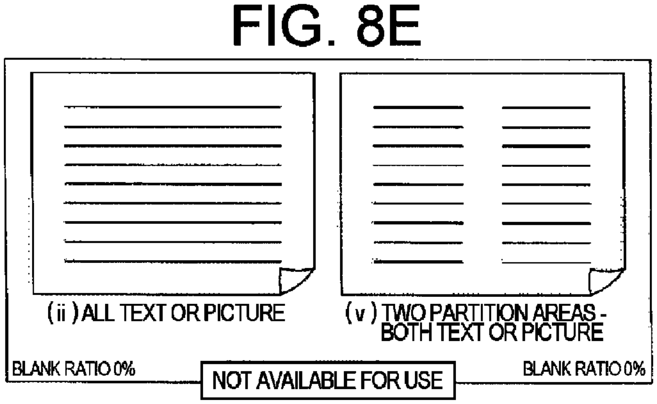

Such document separation is performed to the documents of i to X of FIG. 5 so that the documents are separated as shown in FIGS. 8A to 8E. That is, as shown in FIG. 8A, the document of i of FIG. 5 is with the blank ratio of 100[%], and is separated into the tray 1, and as shown in FIG. 8B, the documents of iV and Viii of FIG. 5 are separated into the tray 2 as with the blank ratios of 80 and 75[%], respectively. As shown in FIG. 8C, the documents of iii and Vii of FIG. 5 are separated into the tray 3 as with the blank ratios of 50 and 45[%], respectively. As shown in FIG. 8D, the documents of Vi and X of FIG. 5 are separated into the tray 4 as with the blank ratios of 25 and 20[%], respectively. As shown in FIG. 8E, the documents of ii and V of FIG. 5 are separated into the tray 5 as with both the blank ratio of 0[%].

As such, the printing medium separation apparatus 100 of this embodiment is capable of generating document image data for both surfaces of a document, i.e., the surface and the underside, and the resulting document image data can be partitioned thereby into a plurality of partition areas. The printing medium separation apparatus is also capable of calculating the blank amount for each of the partition areas, and based on the blank amounts, determining whether each of the partition areas is blank or not. The printing medium separation apparatus is also capable of calculating a blank ratio for the surface of the document and the underside thereof based on the determination result, and document separation can be performed based on the blank ratios calculated as such. As such, the documents can be separated into trays varying in type depending on the value of the blank ratio so that the documents can be separated with ease into various purposes of recycle uses.

What is more, when the document image data is generated, any component of the underside image possibly observed when the density information is extracted can be removed so that the blank ratio can be calculated for documents with higher accuracy.

Even if with a document whose sides are both printed, the blank ratio is calculated for both sides of the document, and then the document is separated based on one of the calculated blank ratios being larger in value. This achieves document separation with more reliability in accordance with purposes varying in type.

Moreover, based on the proximity of blank spaces, i.e., whether the blank spaces are located close to each other, any blank space located away from others is not included for calculation of a blank ratio so that the blank ratio can be calculated with higher accuracy while leaving out any blank spaces not available for recycle use. This thus enables to perform document separation with more reliability in accordance with use purposes varying in type.

In the first embodiment above, the density information extraction section 12 corresponds to the density information extraction unit of the first or eighth aspect, and the document image data generation section 14 corresponds to the image data generation unit of the eighth aspect. The area partition section 16 corresponds to the area partition unit of the first or eighth aspect, the blank amount calculation section 18 corresponds to the blank amount calculation unit of any one of the aspects of first, third, and fourth, and the document separation section 20 corresponds to the separation unit of any one of the aspects of first, third, seven, and eighth.

Also in the first embodiment above, step S106 corresponds to extracting the density information in any one of the aspects of ninth, sixteenth, eighteenth, and twenty-fifth. Steps S108 to S112 correspond to generating the image data in the sixteenth or twenty-fifth aspect. Step S114 corresponds to area partitioning of any one of the aspects of ninth, sixteenth, eighteenth, and twenty-fifth. Steps S116 to 118 correspond to calculating the amount of a blank space of any one of the aspects of ninth, eleventh, twelfth, sixteenth, eighteenth, twentieth, twenty-first, and twenty-fifth. Steps S120 to S132 correspond to document separating in any one of the aspects of ninth, eleventh, fifteenth, eighteenth, twentieth, and twenty-fourth.

Second Embodiment

Described next is a second embodiment of the invention by referring to the accompanying drawings. FIGS. 9 to 12 are diagrams showing the second embodiment of the invention, i.e., a printing medium separation apparatus, a printing medium separation program, a storage medium storing therein the program, and a printing medium separation method.

Compared with the first embodiment described above, the difference of the second embodiment lies only in the partitioning of document image data in the area partition section 16, and the remaining is the similar to the first embodiment. The printing medium separation apparatus of the second embodiment is configured similarly to the printing medium separation apparatus 100 of the first embodiment. Described below are only differences from the first embodiment, and any components similar to those in the first embodiment are provided with the same reference numerals and not described twice.

In the second embodiment, the area partition section 16 determines whether image lines in the lateral and vertical directions are blank image lines or not in an image area selected in a document image. Such a determination is made based on document image data. Based on the determination result, the area partition section 16 partitions the selected image area into two partition areas of the same size.

To be specific, the area partition section 16 determines whether pixels configuring an image line are all taking a value indicating the color of white. When the determination result is Yes, the image line is determined as being a blank image line. The area partition section 16 then compares, in terms of total number, the blank image lines in the lateral direction with those in the vertical direction, and partitions the selected image area into two partition areas of the same size using a virtual partition line in the direction with the larger number of lines.

That is, if with more blank image lines in the lateral direction, the selected area is partitioned, in the lateral direction, into two partition areas by a virtual partition line in the lateral direction. If with more blank image lines in the vertical direction, the selected area is partitioned, in the vertical direction, into two partition areas by a virtual partition line in the vertical direction. The resulting partition areas will serve as image areas available for selection, and such partitioning is repeated similarly to the above to each of the image areas until the document image is partitioned into any desired number of areas.

Figure 9:
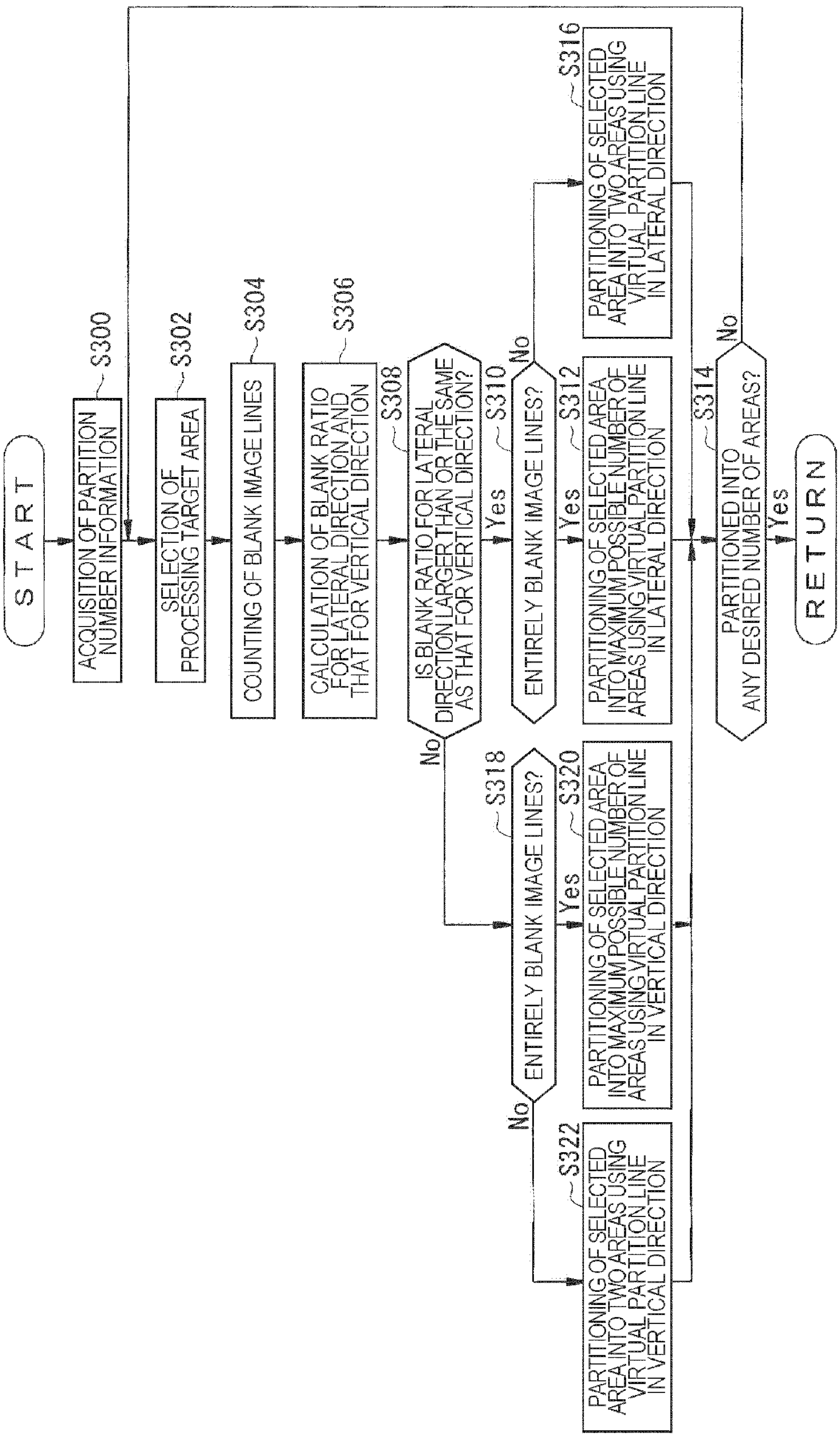
FIG. 9 is a flowchart of area partitioning by the area partition section 16 in a second embodiment of the invention.

By referring to FIG. 9, described next is the process flow of area partitioning in step S114. FIG. 9 is a flowchart of area partitioning to be performed by the area partition section 16 in the second embodiment.

When the area partitioning is started, as shown in FIG. 9, the procedure first goes to step S300. In step S300, the area partition section 16 acquires partition number information, and the procedure then goes to step S302.

In step S302, in the area partition section 16, an image area is selected from a document image for use as a processing target, and the procedure then goes to step S304.

In step S304, the area partition section 16 goes through blank image line counting, i.e., counting the total number of the blank image lines in both the lateral and vertical directions, based on the binary image data for the image area selected in step S302. The procedure then goes to step S306.

In step S306, the area partition section 16 calculates a blank ratio for the blank image lines in the lateral direction based on both the total number of the blank image lines in the lateral direction and the total number of the image lines in the lateral direction in the target area. The area partition section 16 also calculates a blank ratio for the blank image lines in the vertical direction based on both the total number of the blank image lines in the lateral direction and the total number of the image lines in the vertical direction in the target area. The procedure then goes to step S308.

In step S308, the area partition section 16 compares the blank ratio for the blank image lines in the lateral direction and that for the blank image lines in the vertical direction in the selected image area, and determines whether the blank ratio for the blank image lines in the lateral direction is larger or the same as that for the blank image lines in the vertical direction. When the blank ratio in the lateral direction is determined as being larger or the same as that in the vertical direction (Yes), the procedure goes to step S310, and if not, the procedure goes to step S318.

In step S310, the area partition section 16 determines whether or not the image lines in the selected image area are entirely the blank image lines in the lateral direction. When the determination result is Yes, the procedure goes to step S312, and if No, the procedure goes to step S316.

In step S312, the area partition section 16 partitions the selected image area into the maximum possible number of partition areas using virtual partition lines in the lateral direction. The procedure then goes to step S314.

In step S314, the area partition section 16 determines whether the document image data is partitioned into any desired number of partition areas. When the determination result is Yes, this is the end of the process and the procedure returns to the original process, and if No, the procedure returns to step S302.

On the other hand, in step S310, when the procedure goes to step S316 because the image lines in the selected image area are not entirely the blank image lines in the lateral direction, the area partition section 16 partitions, in the lateral direction, the selected image area into two partition areas of a uniform size using a virtual partition line in the lateral direction. The procedure then goes to step S314.

In step S308, when the procedure goes to step S318 because there are more blank image lines in the vertical direction than those in the lateral direction, the area partition section 16 determines whether the image lines in the selected image area are entirely the blank image lines in the vertical direction or not. When the determination result is Yes, the procedure goes to step S320, and if No, the procedure goes to step S322.

In step S320, the area partition section 16 partitions the selected image area into the maximum possible number of partition areas of a uniform size using virtual partition lines in the vertical direction. The procedure then returns to step S314.

On the other hand, in step S322, the area partition section 16 partitions, in the vertical direction, the selected image area into two partition areas of a uniform size using the virtual partition line in the vertical direction. The procedure then goes to step S314.

Figure 10:
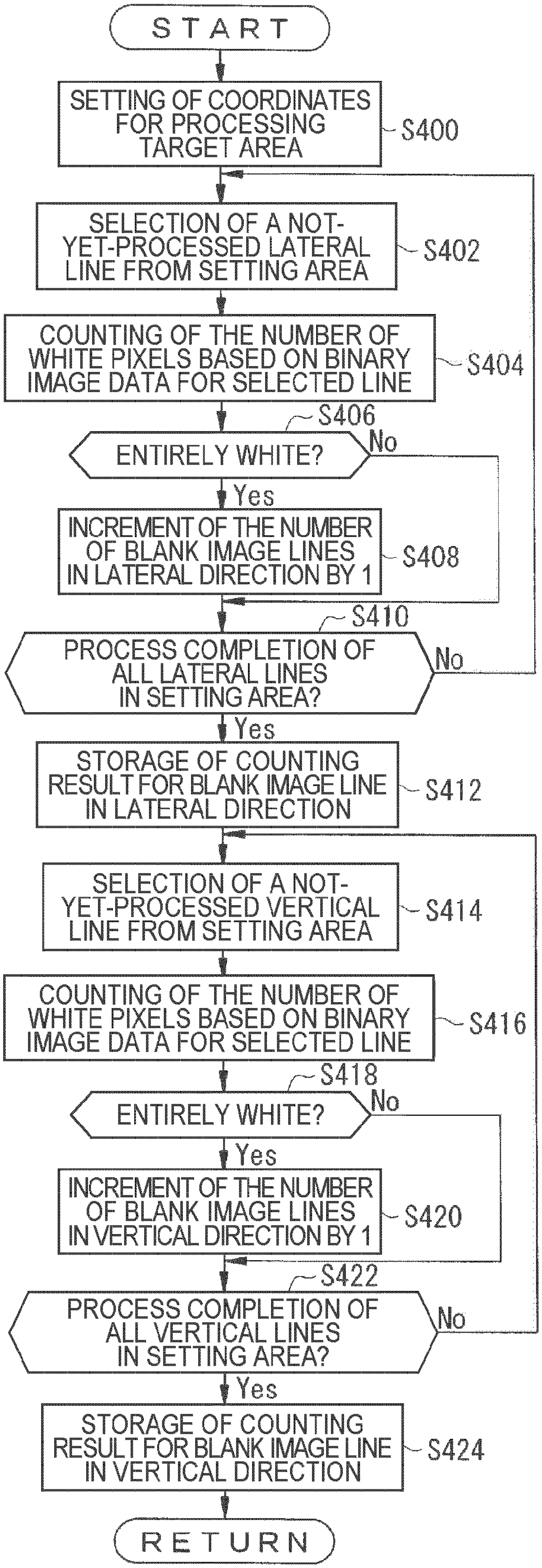
FIG. 10 is a flowchart of blank image line counting by the area partition section 16.

By referring to FIG. 10, described next is the process flow of counting the blank image lines in step S304. FIG. 10 is a flowchart of counting the blank image line by the area partition section 16.

When the blank image line counting is started, as shown in FIG. 10, the procedure first goes to step S400. In step S400, the area partition section 16 sets coordinates for an image area being a processing target. The procedure then goes to step S402.

In step S402, the area partition section 16 makes a selection from the document image data of the area of the coordinates set as such, i.e., selects image data of a lateral line not yet through with line counting. The procedure then goes to step S404.

In step S404, the area partition section 16 counts the number of white pixels, i.e., pixels with the value of "1", in the document image data of the image line selected in step S402. The procedure then goes to step S406.

In step S406, based on the information about the coordinates set as such, and based on the counting result in step S404, the area partition section 16 determines whether pixels of the selected image line in the lateral direction are entirely white pixels or not. When the determination result is Yes, the procedure goes to sep S408, and if No, the procedure goes to step S410.

In step S408, the area partition section 16 increments the number of the blank image lines by 1, and the procedure goes to step S410.

In step S410, the area partition section 16 determines whether every image line in the lateral direction in the area of the set coordinates is through with line counting. When the determination result is Yes, the procedure goes to step S412, and if No, the procedure returns to step S402.

In step S412, the area partition section 16 stores information about the total number of blank image lines in the lateral direction into the RAM 62 or the secondary storage 70. The procedure then goes to step S414.

In step S414, the area partition section 16 makes a selection from the document image data of the area of the set coordinates, i.e., selects image data of a vertical line not yet through with line counting. The procedure then goes to step S416.

In step S416, the area partition section 16 counts the number of white pixels, i.e., pixels with the value of "1" in this embodiment, in the document image data of the image line selected in step S414. The procedure then goes to step S418.

In step S418, based on the information about the coordinates set as such, and based on the counting result in step S416, the area partition section 16 determines whether pixels of the selected image line in the vertical direction are entirely white pixels or not. When the determination result is Yes, the procedure goes to sep S420, and if No, the procedure goes to step S422.

In step S420, the area partition section 16 increments the number of the blank image lines in the vertical direction by 1, and the procedure goes to step S422.

In step S422, the area partition section 16 determines whether every image line in the vertical direction in the area of the coordinates set as such is through with line counting. When the determination result is Yes, the procedure goes to step S424, and if No, the procedure returns to step S414.

In step S424, the area partition section 16 stores information about the total number of blank image lines in the vertical direction into the RAM 62 or the secondary storage 70. This is the end of the series of processes and the procedure returns to the original process.

By referring to FIG. 11 to 12, described next is the operation of the printing medium separation apparatus of the second embodiment.

Figure 11:
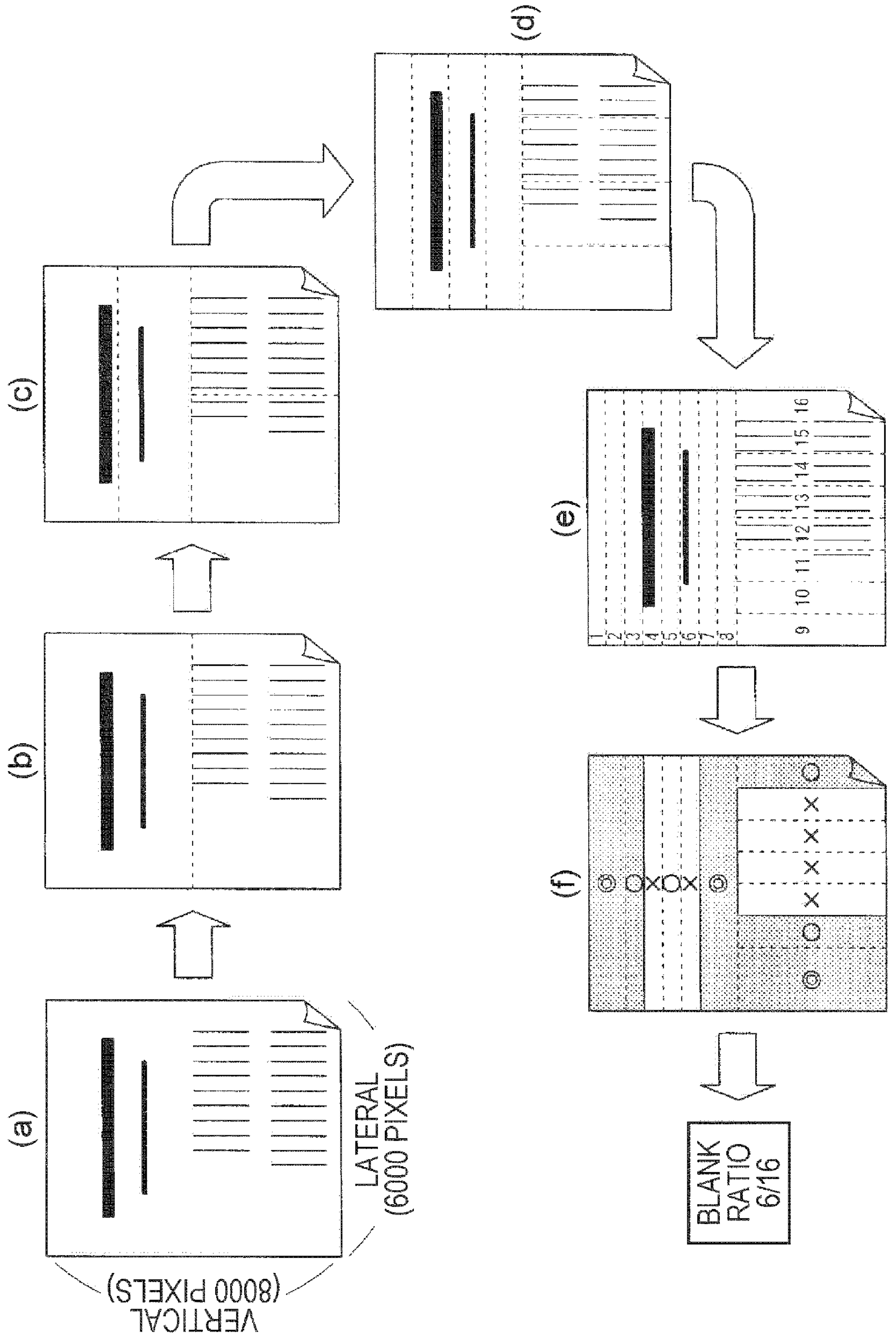
FIG. 11 shows an exemplary process flow from area partitioning to blank ratio calculating in the second embodiment of the invention.

In FIG. 11, a to f show an exemplary process flow from the area partitioning to the blank ratio calculating in the second embodiment. FIG. 12 is a diagram showing the relationship among coordinates information of each of the partition areas after area partitioning, information indicating whether the area is a blank space or not, and information about the proximity of the partition areas.

The process flow before generating the document image data is the same as that of the first embodiment above, and described below is the operation starting from area partitioning.

When the document image data generation section 14 generates document image data for a document of a of FIG. 11, i.e., similar to the document on the left side of FIG. 6, the area partition section 16 acquires partition number information (step S300). In this embodiment, exemplified is a case that the acquired partition number information indicates the partition number of 16 as in the first embodiment.

After the partition number information is acquired as such, the document image is entirely selected as a processing target area (step S302) so that the process of blank image line counting is executed (step S304).

After the process of blank image line counting is started, the area partition section 16 selects, i.e., acquires, from the document image data, image data of a line in the lateral direction not yet through with line counting (step S402). In this example, the document image data is assumed as being configured by pixel data of 6000 pixels in the lateral direction and 8000 pixels in the vertical direction. The coordinates of a pixel on the upper left of the document image is set to (x, y)=(0, 0) with the lateral axis being x and the vertical axis being y, and the coordinates of a pixel on the lower right is set to (x, y)=(5999, 7999).

The selection of the image data in the lateral direction is started specifically from the top to the bottom of the document image of a in FIG. 11 line by line, i.e., the image data corresponding to the coordinates of a line in the lateral direction. As to the image data of the lines in the lateral direction, from the top to the bottom, the first line extends from the coordinates of (0, 0) to (5999, 0), the second line extends from the coordinates of (0, 1) to (5999, 1), . . . the 7999th line extends from the coordinates of (0, 7998) to (5999, 7998), and the 8000th line extends from the coordinates of (0, 7999) to (5999, 7999).

When the image data of a line in the lateral direction is selected, the number of white pixels (the number of pixels with the value of 1") is counted based on the pixel value of the image data (step S404). When the counting result shows the value of 8000, i.e., every pixel of the selected line is a white pixel, (branch of "Yes" in step S406), the selected line is determined as being a blank image line, and the number of the blank image lines in the lateral direction is incremented by 1 (initial value is 0) (step S408). When the counting result shows the value smaller than 8000 (branch of "No" in step S406) the selected line is determined as not being a blank image line.

Such line determination and counting, i.e., the image lines in the lateral direction are determined whether being blank image lines or not, and the blank image lines are counted, is performed to every image line in the lateral direction in the document image line by line sequentially from the top to the bottom. When every line is through with such line determination and counting, i.e., from the line extending from the coordinates of (0, 0) to (5999, 0) to the line extending from the coordinates of (0, 7999) to (5999, 7999), i.e., branch of "Yes" in step S410, the counting result of the blank image lines in the lateral direction is stored in the RAM 62, and the number of the blank image lines is initialized (step S412).

After the counting result of the blank image lines in the lateral direction is stored, the area partition section 16 selects, i.e., acquires, from the document image data, image data of a line in the vertical direction not yet through with line counting (step S414).

The selection of the image data in the vertical direction is started specifically from the left to the right of the document image of a in FIG. 11 line by line, i.e., started from the image data corresponding to the coordinates of a line in the vertical direction. As to the image data of the lines in the vertical direction, from the top to the bottom, the first line extends from the coordinates of (0, 0) to (0, 7999), the second line extends from the coordinates of (1, 0) to (1, 7999), . . . the 5999th line extends from the coordinates of (5998, 0) to (5998, 7999), and the 6000th line extends from the coordinates of (5999, 0) to (5999, 7999).

When the image data of a line in the vertical direction is selected, the number of white pixels (the number of pixels with the value of 1") is counted based on the pixel value of the image data (step S416). When the counting result shows the value of 6000, i.e., every pixel of the selected line is a white pixel (branch of "Yes" in step S418), the selected line is determined as being a blank image line, and the number of the blank image lines in the vertical direction is incremented by 1 (initial value is 0) (step S420). When the counting result shows the value smaller than 6000 (branch of "No" in step S418), the selected line is determined as not being a blank image line.

Such line determination and counting, i.e., the image lines in the vertical direction are determined whether being blank image lines, and the blank image lines are counted, is performed to every image line in the vertical direction in the document image sequentially line by line from the left to the right. When every line is through with such line determination and counting, i.e., from the line extending from the coordinates of (0, 0) to (0, 7999) to the line extending from the coordinates of (5999, 0) to (5999, 7999), i.e., branch of "Yes" in step S422, the counting result of the blank image lines in the vertical direction is stored in the RAM 62, and the number of the blank image lines is initialized (step S424).

After the document image being a processing target is entirely subjected to a calculation of the blank image lines in the lateral and vertical directions as such, the total number WW of the blank image lines in the lateral direction is divided by the total number WB of the image lines in the lateral direction of the target area. The division result is converted into percentage so that the blank ratio WR is calculated for the blank image lines in the lateral direction. That is, in accordance with the calculation equation of WR=WW/WB×100 [%], the blank ratio WR is calculated for the blank image lines in the lateral direction (step S306). Similarly, the blank ratio HR of the blank image lines in the vertical direction is calculated in accordance with the calculation equation of HR=HW/HB×100[%] where HW denotes the total number of blank image lines in the vertical direction, and HB denotes the total number of image lines in the vertical direction of the target area (step S306).

Assuming that the number of the blank image lines in the lateral direction is 4500 in total, and the number of the blank image lines in the vertical direction is 2000 in total, WW will be 4500 and WB will be 8000. In this case, the blank ratio WR for the blank image lines in the lateral direction will be WR=4500/8000×100=56.25[%]. Moreover, HW will be 2000 and HB will be 6000 so that the blank ratio HR for the blank image lines in the vertical direction will be WR=2000/6000×100=33.33[%].

The resulting blank ratios calculated for the blank image lines in the lateral and vertical directions are compared with each other. In this case, as the above-described exemplary calculation, the blank ratio for the blank image lines in the lateral direction is assumed as being larger than that in the vertical direction (branch of "Yes" in step S308). In a of FIG. 11 example, the surface of the document is printed with images, and thus the total number of the blank image lines in the lateral direction will be smaller than 8000 (branch of "No" in step S310).

Accordingly, in this case, the document image being the processing target is entirely partitioned, in the lateral direction, into two partition areas of a uniform size by a virtual partition line in the lateral direction as shown in b of FIG. 11 (step S316). Specifically, the document image data is partitioned into data corresponding to two partition areas, i.e., image data from coordinates of (0, 0) to (5999, 3999) and image data from coordinates of (0, 4000) to (5999, 7999). In FIG. 11, the dotted lines in b to f are each a virtual partition line.

As such, the document image data is partitioned into groups of image data corresponding to two partition areas one on the other. Because the partition number identified by the partition number information is 16 (branch of "No" in step S312), the upper area of the two is first selected as a processing target area (step S302). The process of blank image line counting is performed similarly to the above (step S304), and the selected area is subjected to a calculation of the number in total of the blank image lines in the lateral and vertical directions (steps S400 to S424).

In FIG. 11 example, in a, the upper half of the document image is mostly filled only with horizontal text and there are many blank lines, and the lower half thereof is mostly filled only with vertical text and almost every line has letters and characters. That is, the upper area of the two partition areas has the larger number of blank image lines in the lateral direction, and the lower area thereof has the larger number of blank image lines in the vertical direction.

Therefore, in the selected upper area, the blank ratio WR for the blank image lines in the lateral direction becomes larger than the blank ratio HR for the blank image lines in the vertical direction (branch of "Yes" in step S308), and not every line will be a blank image line (branch of "No" in step S310). As shown in c of FIG. 11, the upper area is thus partitions, in the lateral direction, again into two partition areas of a uniform size using another virtual partition line in the lateral direction (step S316).

The area partition section 16 then selects the lower area of the two partition areas as a processing target area (step S302). The area partition section 16 then executes the process of blank image line counting similarly to the above (step S304), and subjects the selected area to a calculation of the number in total of the blank image lines in the lateral and vertical directions (steps S400 to S424). As described in the foregoing, because the lower area is filled with the vertical text, the blank ratio HR for the blank image lines in the vertical direction becomes larger than the blank ratio WR for the blank image lines in the lateral direction (branch of "No" in step S308), and not every line will be a blank image line (branch of "No" in step S318). As shown in c of FIG. 11, the lower area is thus partitioned, in the vertical direction, again into two partition areas of a uniform size using another virtual partition line in the vertical direction (step S322).

By repeating such processes as above, as shown in d of FIG. 11, the document image data will be partitioned into eight partition areas. From the partition areas of the document image of d of FIG. 11, when the top area is selected as a processing target area (step S302), based on the document image data of this area, the process of blank image line counting is executed similarly to the above (step S304), and the selected area is subjected to a calculation of the number in total of the blank image lines in the lateral and vertical directions (step S400 to S424). These calculation results are used as a basis to calculate the blank ratio WR for the blank image lines in the lateral direction and the blank ratio HR for the blank image lines in the vertical direction. As shown in d of FIG. 11, because the selected area is entirely configured by blank image lines, the blank ratio WR for the blank image lines in the lateral direction and the blank ratio HR for the blank image lines in the vertical direction are both 100[%]

(branch of "Yes" in step S308). Moreover, because the selected area is entirely configured by blank image lines in the lateral direction (step S312), the selected area is then partitioned uniformly into the maximum possible number of partition areas of a uniform size using a virtual partition line in the lateral direction (step S312). In this case, because the maximum possible number is 2, the selected area is partitioned, in the lateral direction, into two partition areas of a uniform size one on the other.

As such, for any area entirely configured by blank pixels, the selected area is partitioned into maximum possible number of areas using virtual partition lines in the direction with the larger blank ratio.

As the procedure proceeds as above, as shown in e of FIG. 11, the document image is eventually partitioned into 16 partition areas (branch of "Yes" in step S314). Note here that numerical characters in e of FIG. 11 each denote an area number assigned to each of the partition areas.

As is known from e of FIG. 11, the upper area of the document image mostly filled with horizontal text is partitioned only by virtual partition lines in the lateral direction, and the lower area of the document image mostly filled with vertical text is partitioned only by virtual partition lines in the vertical direction.

Similarly to the first embodiment above, based on the document image data of every partition area, the amount of a blank space is calculated for each of the partition areas so that the partition areas are each determined whether being blank space (○) or not (×) (step S116). In FIG. 11, f shows the determination result derived for each of the partition areas, i.e., the 10 areas of 1, 2, 3, 5, 7, 8, 9, 10, 11, and 16 are determined as being blank, and the remaining areas are determined as not being blank.

FIG. 12 shows information about the document image of a of FIG. 11, i.e., the partition result with the partition number of 16, the result of blank space determination, and the proximity information about blank spaces. In FIG. 12, the area numbers are corresponding to those in e of FIG. 11 assigned to the partition areas, and the determination results correspond to "○" and "×" in f of FIG. 11. Note here that the proximity information in FIG. 12 is of the case where any two areas are mainly focused, and indicates, for each of the partition areas, the area number for any other partition areas forming the area with the proximity number 2. Note here that, in FIG. 12 example, the proximity information is for only one direction, i.e., downward or rightward.

The blank ratio is then calculated based on the determination results and the proximity information about the blank spaces (step S118). In this example, considered is only any proximity in one direction, and even if there are three blank spaces with the proximity number of three, the number of the partition areas being close to each other in one direction is only one. As such, the area with the proximity number of 2 will be the six partition areas of 1, 2, 7, 8, 9, and 10 as indicated by "◎" in f of FIG. 11. As such, with respect to the entire number of partition areas of 16, the number of blank spaces is six, and with similar calculation as in the first embodiment, the blank ratio will be $6/16\times100\cong38$[%].

As shown in the drawing on the right side of FIG. 6, in the first embodiment, a document image is partitioned into 16 rectangular-shaped partition areas of a uniform size for calculation of a blank ratio. Therefore, even any area mostly filled with horizontal text (or horizontal lines) or an area mostly filled with vertical text (or vertical lines) is also partitioned uniformly into substantially-square-shaped areas. As a result, if with any document as shown in the drawing on the left side of FIG. 6 or a of FIG. 11, i.e., a document whose upper half area is filled only with horizontal text and whose lower half area is filled only with vertical text, the blank ratio will be unnecessarily small. On the other hand, as in this embodiment, areas are each partitioned by a virtual partition line in an appropriate direction based on the total number of the blank image lines in the lateral direction and those in the vertical direction. In this manner, the blank ratio can be derived with higher accuracy.

As such, with the printing medium separation apparatus 100 of this embodiment, the area partition section 16 is allowed to subject document image data of a processing target area to a calculation of the number in total of blank image lines in the lateral direction and those in the vertical direction.

What is more, the total number of the blank image lines calculated for the lateral and vertical directions are used as a basis to calculate the blank ratio WR for the blank image lines in the lateral direction in the processing target area and the blank ratio HR for the blank image lines in the vertical direction therein.

Moreover, based on the blank ratios WR and HR calculated as such, it is possible to determine the direction of the virtual partition lines for use to partition a processing target area, and using the virtual partition line oriented in accordance with the determination, the processing target area can be partitioned.

When a processing target area is entirely configured only by blank image lines, the processing target area is partitioned into the maximum possible number of partition areas by virtual partition lines in the lateral or vertical direction. When a processing target area is not configured only by blank image lines, the processing target area is partitioned into the two partition areas of a uniform size by a virtual partition line in the lateral or vertical direction.

Such partitioning is repeated until document image data is partitioned into any desired number of partition areas. This favorably leads to calculation of blank ratio with higher accuracy, and a document can be subjected to separation with more reliability in accordance with various purposes.

In the second embodiment above, the density information extraction section 12 corresponds to the density information extraction unit of the first or eighth aspect, and the document image data generation section 14 corresponds to the image data generation unit of the eighth aspect. The counting of blank image lines in the area partition section 16 corresponds to the blank image line counting unit of the fifth or sixth aspect, and the area partitioning in the area partition section 16 corresponds to the area partition unit of any one of the aspects of first, fifth, sixth, or eighth. The blank amount calculation section 18 corresponds to the blank amount calculation unit of any one of the aspects of first, third, fourth, and eighth, and the document separation section 20 corresponds to the separation unit of any one of the aspects of first, third, seventh, and eighth.

Also in the second embodiment above, step S106 corresponds to extracting the density information in any one of the aspects of ninth, sixteenth, eighteenth, and twenty-fifth. Steps S108 to S112 correspond to generating the image data in the sixteenth or twenty-fifth aspect. Step S114 corresponds to area partitioning of any one of the aspects of ninth, thirteenth, fourteenth, sixteenth, eighteenth, twenty-second, twenty-third, and twenty-fifth. Steps S116 to 118 correspond to calculating the amount of a blank space of any one of the aspects of ninth, eleventh, twelfth, sixteenth, eighteenth, twentieth, twenty-first, and twenty-fifth. Steps S120 to S132 correspond to document separating in any one of the aspects of ninth, eleventh, fifteenth, eighteenth, twentieth, and twenty-fourth.

In the second embodiment above, steps S400 to S424 each correspond to calculating the blank image lines in any one of the aspects of thirteenth, fourteenth, twenty-second, and twenty-third.

Third Embodiment

Described next is a third embodiment of the invention by referring to the accompanying drawings. FIGS. 13 to 16B are diagrams showing the third embodiment of the invention, i.e., a printing device, a printing device control program, a storage medium storing therein the program, and a printing device control method.

The printing device of the third embodiment has a function equivalent to the printing medium separation apparatuses 100 of the first and second embodiments above, and with the function, selects any separated paper available for recycle use, and prints images of image data requested for printing onto any blank portion of the selected paper. Described below are only differences from the first and second embodiments, and any components similar thereto are provided with the same reference numerals and not described twice.

Figure 13:
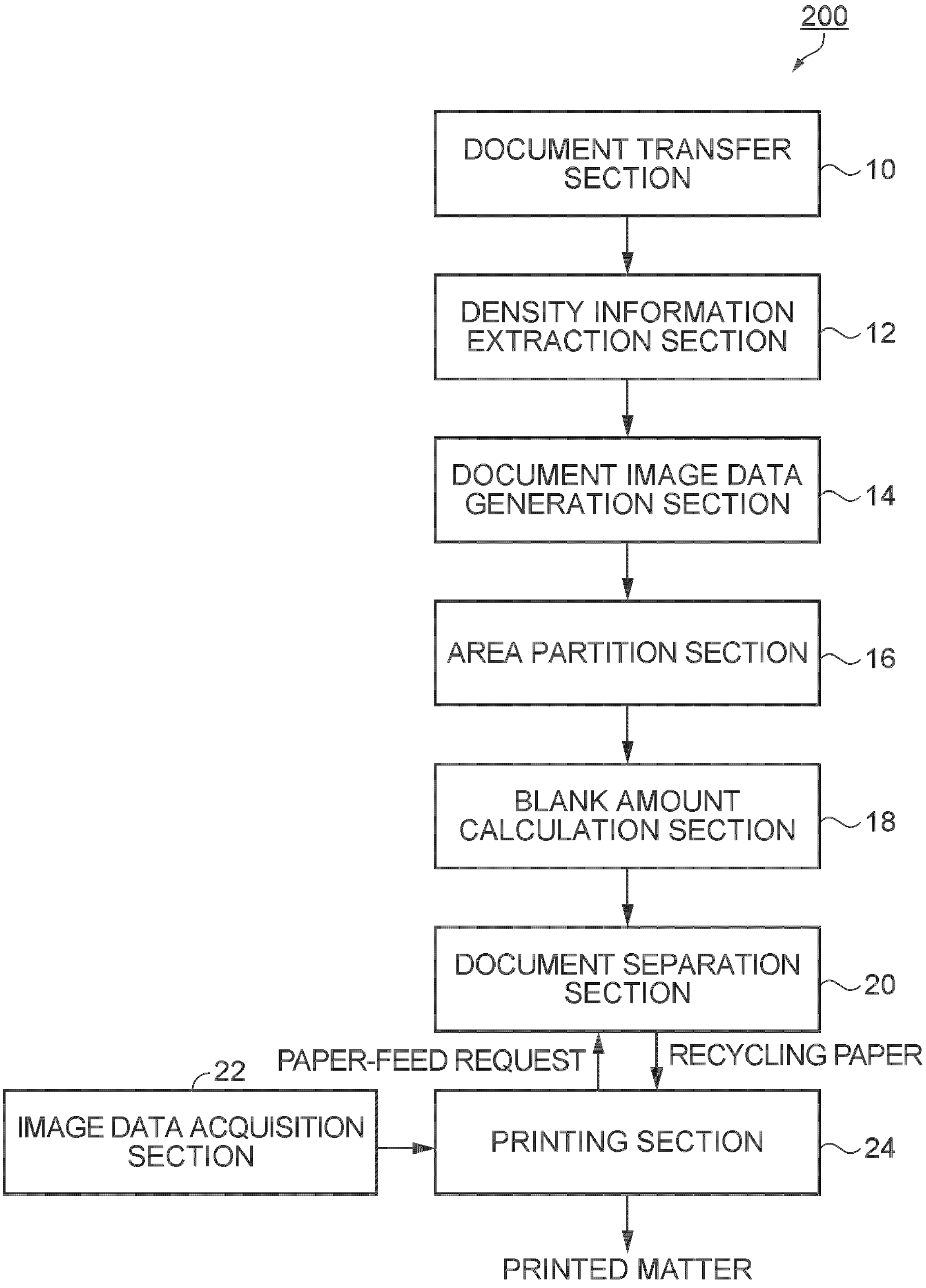
FIG. 13 is a block diagram showing the configuration of the printing device 200 of a third embodiment of the invention.

First of all, the configuration of the printing device of this embodiment is described by referring to FIG. 13. FIG. 13 is a block diagram showing the configuration of a printing device 200 of the third embodiment of the invention.

As shown in FIG. 13, the printing device 200 is configured to include the document transfer section 10, the density information extraction section 12, the document image data generation section 14, the area partition section 16, the blank amount calculation section 18, the document separation section 20, an image data acquisition section 22, and a printing section 24. The document transfer section 10 serves to transfer a document, i.e., paper, set on a transfer tray to a density extraction area, which will be described later. The density information extraction section 12 serves to extract density information about the document, i.e., the entire surface thereof, having reached the density extraction area. The document image data generation section 14 serves to generate document image data based on the extracted density information. The area partition section 16 serves to partition a document image into a plurality of partition areas based on the document image data. The blank amount calculation section 18 serves to calculate the amount a blank space for each of the partition areas, and calculate a blank ratio of the document image based on the amount of the blank space calculated as such. The document separation section 20 serves to perform document separation based on the blank ratio calculated as such. The image data acquisition section 22 acquires image data being a printing target. The printing section 24 performs printing to the separated paper using a printing head (not shown) based on the acquired image data.

In this embodiment, the document separation section 20 includes a paper-feed tray being a separation destination for documents with a blank ratio of a predetermined value or larger, and a paper-eject tray being a separation destination for documents with a blank ratio smaller than the predetermined value. The document separation section 20 has a function of performing document separation onto the paper-feed tray and the paper-eject tray based on the blank ratios calculated by the blank amount calculation section 18.

The image data acquisition section 22 has a function of acquiring image data for printing use over a network or others, or directly reading the image data from an image (data) reading device that is not shown, e.g., scanner or CD-ROM drive. The image data is provided by a printing command device (not shown) such as personal computer (PC) and a printer server connected to the printing device 200. If with image data being multi-value RGB data, e.g., data in which the gray scale, i.e., density or brightness value, of every color, i.e., Red (R) Green (G), and Blue (B), of a pixel is represented by 8 bits (0 to 255), the image data acquisition section 22 has a function of subjecting the image data to color conversion to convert the image data into multi-value CMYK (if with four colors of cyan (C), magenta (M), yellow (Y) and black (K) ) data corresponding to ink colors of the printing head. The image data acquisition section 10 also has a function of converting, before the color conversion, the resolution of the CMYK image data into the resolution corresponding to the printing resolution.

The printing section 24 is a printer of an ink jet type that ejects ink droplets in dots from nozzles provided to the printing head so that an image of a plurality of dots is formed on a printing medium. The printing section 24 is configured to include, in addition to the printing head described above, any known components, e.g., a paper feeding mechanism that is not shown to move the printing medium, and a printing controller mechanism that is not shown to exercise control over the ink discharge of the printing head based on printing data generated from the image data.

Based on information found in the printing request information about the paper-feed types, the printing section 24 selects any one of a plurality of paper-feed trays of a blank ratio identified by the information about the paper-feed types, and prints an image of the image data onto a blank space of the paper coming from the selected paper-feed tray. The printing section 24 has a function of, for any paper with a blank ratio being not 100[%], printing a determination image onto any image-printed portion being not the blank space to see whether the image is a previously-printed image or not. When any command comes for layout printing for any paper with a blank ratio being not 100[%], onto a blank space of the transferred paper, the printing section 24 has a function of scaling down the image of image data depending on the size of the blank space.

The printing head ejects circular dots on a blank printing paper through ink discharge from nozzles using piezoelectric elements exemplified by piezo actuators, which are not shown but provided to every ink chamber. The inks are filled in the ink chambers, which are not shown but are respectively provided to the nozzles. The printing head can also print dots varying in size for each of the nozzles, and others, by control exercise over the discharge amount of ink coming from the ink chambers through voltage change for application step by step to the piezo actuator.

The printing device 200 is configured to include a computer system for application of various types of control for document separation, various types of printing and for implementation of the components on software, i.e., the document transfer section 10, the density information extraction section 12, the document image data generation section 14, the area partition section 16, the blank amount calculation section 18, the document separation section 20, the image data acquisition section 22, the printing section 24, and others. As shown in FIG. 2, the hardware configuration is similar to that of the printing medium separation apparatus 100, i.e., the In/Out bus 68 varying in type, e.g., a PCI (Peripheral Component Interconnect) bus, or an ISA (Industrial Standard Architecture) bus is connecting the CPU (Central Processing Unit) 60, the RAM (Random Access Memory) 62, and the ROM (Read Only Memory) 64. The CPU 60 takes charge of application of various types of control and computation processes, the RAM 62 is configuring a main storage, and the ROM 64 is a storage device only for data reading. This bus 68 is connected with, via the input/output interface (I/F) 66, the secondary storage 70 such as HDD (Hard Disk Drive), the printing section 24, the output unit 72 such as CRT, LCD (Liquid Crystal Display) monitor, the input unit 74 such as operation panel, and others.

When the printing device 200 is turned on, a system program, e.g., BIOS, stored in the ROM 64 or others loads any specific computer programs varying in type into the RAM 62. The computer programs are those stored in the ROM 64 in advance, or those installed into the secondary storage 70 via a storage medium such as CD-ROM, DVD-ROM, or Flexible Disk (FD), or over a communications network L such as the Internet. In accordance with commands written in the program loaded into the RAM 62 as such, the CPU 60 applies any predetermined control and performs any predetermined computation process by using various types of resources so that the functions described above for the component units can be implemented on the software.

By referring to FIG. 14, described next is the operation flow of the printing device 200 configured as above. Herein, FIG. 14 is a flowchart of printing by the print device 200.

Figure 14:
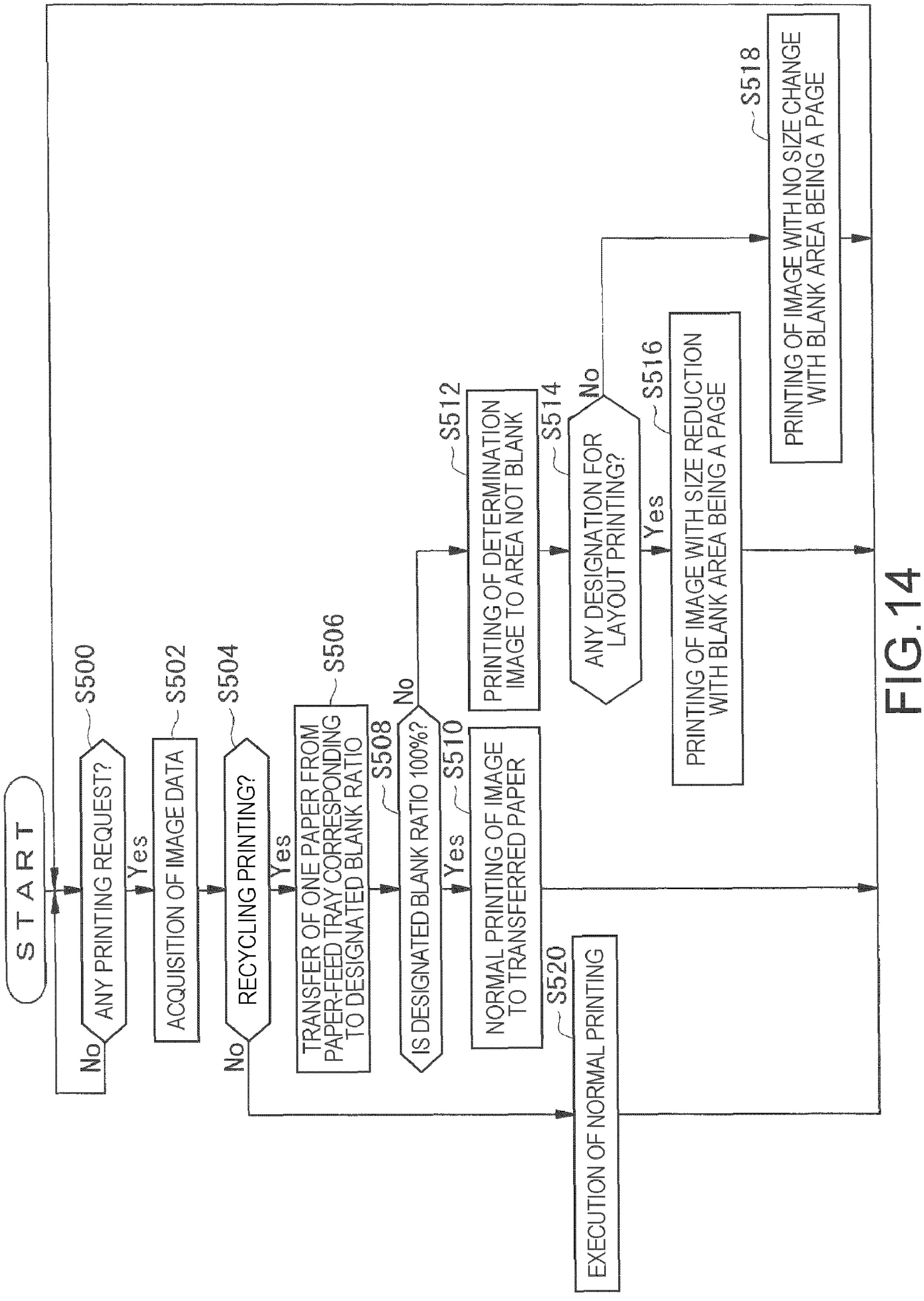
FIG. 14 is a flowchart of printing by the print device 200.

As shown in FIG. 14, when printing is started, the procedure first goes to step S500, and the image acquisition section 22 determines whether or not there is a printing request from a printing command terminal or others that is not shown, e.g., personal computer. When the determination result is Yes, the procedure goes to step S502, and if No, the determination process is repeated until such a printing request comes.

In step S502, the image data acquisition section 22 acquires image data provided together with the printing request information, and the procedure goes to step S504.

In step S504, in the printing section 24, the printing request information is used to see whether or not it is recycle printing. When the determination result is Yes, a paper-feed request is forwarded, to the document separation section 20, from a paper-feed tray designated by the paper-feed type information found in the printing request information, and the procedure goes to step S506. When the determination result is No, the procedure goes to step S520.

In step S506, the document separation section 20 transfers, to the printing section 24, one paper from the paper-feed tray corresponding to the designated blank ratio found in the paper-feed request, and the procedure then goes to step S508.

In step S508, the printing section 24 determines whether or not the designated blank ratio is 100[%] or not. When the determination result is Yes, the procedure goes to step S510, and if No, the procedure goes to step S512.

In step S510, the printing section 24 prints an image of the image data with a normal printing size corresponding to the paper size, e.g., B5, A4, and A3, and the procedure then returns to step S500.

In step S512, based on the coordinates data and blank space determination data for every partition area at the time of area partitioning, the printing section 24 prints, on any area other than the blank space, a determination image for determination use of the area, e.g., "×", and the procedure then goes to step S514.

In step S514, the printing section 24 determines whether the printing request information is including a command of layout printing. When the determination result is Yes, the procedure goes to step S516, and if No, the procedure goes to step S518.

In step S516, the printing section 24 regards the transferred printing paper as being entirely the blank space, and prints the image of the image data thereonto with size reduction based on the size of the blank space. The procedure then returns to step S500.

In step S518, the printing section 24 regards the blank space of the provided paper as a page, and prints the image of the image data with the normal size corresponding to the size of the paper. The procedure then returns to step S500.

In step S504, when the procedure goes to step S520 because the printing request information is not designating recycle printing, the printing section 24 forwards the paper from the tray piled with both-side-blank papers that are not shown. The printing section 24 then prints the image of the image data with the normal size, and the procedure returns to step S500.

By referring to FIGS. 15 to 16B, described next is the operation of the printing device 200 of this embodiment.

FIG. 15 is a diagram showing the document separation trays by type for separation by the document separation section 20 of the printing device 200 in this embodiment. FIGS. 16A and 16B are each a diagram showing exemplary image printing onto a blank space of a paper with a blank ratio being smaller than 100[%].

The processes to be executed for document separation by the components, i.e., the document transfer section 10, the density information extraction section 12, the document image data generation section 14, the area partition section 16, the blank amount calculation section 18, and the document separation section 20, are not described again if being the same as those in the first and second embodiments.

In this embodiment, the area partitioning is performed as in the second embodiment. Therefore, the area partition section 16 accordingly partitions an area based on the number in total the blank image lines in a document image, i.e., those in the lateral and vertical directions.

As shown in FIG. 15, the document separation section 20 in this embodiment includes five types document separation tray, which is configured to include three paper-feed trays of 1 to 3, and the paper-eject trays of 1 and 2 in accordance with the blank ratio of a document for separation.

As shown in FIG, 15, the paper-feed tray 1 is for any document with the blank ratio of 100[%] on one side, i.e., a tray for separating and feeding a so-called one-side-blank paper, and the paper-feed tray 2 is for any document with the blank ratio of 50 to 99[%] for any blank space configured by blank image lines in the lateral direction, i.e., a tray for separating and feeding any paper available for recycle use. The tray 3 is for any document with the blank ratio of 50 to 99[%] for any blank space configured by blank image lines in the vertical direction, i.e., a tray for separating and feeding any paper available for recycle use. In the below, as appropriate, the document separated onto the paper-feed tray 1 is referred to as one-side-blank paper, and the document separated onto the paper-feed trays 2 and 3 is referred to as recycling paper.

As shown in FIG. 15, the paper-eject tray 1 is for any paper with the blank ratio of 20 to 49[%], i.e., a tray for separating any document not good for printing but still available for use as scratch paper. The paper-eject tray 2 is for any paper with the blank ratio of 0 to 19[%], i.e., a tray for separating any document not good for recycling use.

As such, the document separation section 20 separates documents onto any of the paper-feed trays 1 to 3 and the paper-eject trays 1 and 2 based on the blank ratio and the configuration of blank spaces of a document.

The printing device 200 is also provided with, in addition to these document-separating trays, a paper-supply tray for supply of both-side-blank paper varying in size.

Described next is the printing operation of the printing device 200 with an assumption that the paper-feed trays 1 to 3 carry thereon the separated documents.

After the printing device 200 receives printing request information from a printing command device or others (branch of "Yes" in step S500), the image data acquisition section 22 acquires image data corresponding to the received printing request information (step S502). The image data acquisition section 22 forwards the printing request information and the image data to the printing section 24.

After acquiring the printing request information from the image data acquisition section 22, the printing section 24 determines whether the information includes a designation for recycle printing (in step S504). Assuming here is that the recycle printing is designated (branch of "Yes" in step S504), the printing section 24 then checks the blank ratio of a recycling paper for recycle printing use designated by the printing request information, e.g., the blank ratio is assumed as being identified by the number of the paper-feed tray. When the paper-feed tray 3 is designated, the printing section 24 forwards a transfer request to the document separation section 20 for paper transfer from the paper-feed tray 3.

On the other hand, in response to the transfer request coming from the printing section 24, the document separation section 20 transfers a recycling paper to the printing section 24 from the paper-feed tray 3, which is the designated tray (step S506). In this example, as shown in the upper drawing of FIG. 16A, the left half portion of the printing surface of the recycling paper is printed with text, and the right half portion thereof is a blank space with the blank ratio of 50[%].

When a paper comes from the paper-feed tray 3, because the blank ratio of this paper is 50[%], i.e., the paper is provided from the paper-feed tray 3 (branch of "No" in step S508), the printing section 24 prints, onto any area printed with text, i.e., area not the blank space, a determination image to make the area available for determination by a glance (step S512). In FIG. 16A example, printed is an image shaped like "×" for the entire printing portion.

After printing of such a determination image, the printing section 24 determines whether the printing request information is designating layout printing or not (step S514). When no designation is found for layout printing (branch of "No" in step S514), as shown in FIG. 16A, the image of the acquired image data (only the left half portion of the paper is printed with images in this example) is printed on the blank space of the recycling paper (area on the right hand side) with the size as it is, i.e., the normal size for printing to the recycling paper (step S518). As such, the printing result of FIG. 16A is derived.

That is, when no layout printing is designated, the image of the image data is printed onto the blank space area of a recycling paper with the printing size similar to the case of printing the one-side-blank paper or both-side-blank paper. In FIG. 16A example, the image position of the image data is overlapped the area printed with the image of the recycling paper, the printing position is adjusted (such adjustment is not required when no position overlapping is observed).

On the other hand, when there is a designation for layout printing (branch of "Yes" in step S514), as shown in FIG. 16B, the printing image of the acquired image data, e.g., substantially the entire surface of this example, is reduced in size based on the size of the blank space (to fit in the right half of the recycling paper) and the size-reduced image is printed on the blank space of the recycling paper, i.e., the right half portion (step S516). As such, the printing result of FIG. 16B is derived.

That is, if with a designation for layout printing, the printing size is adjusted in such a manner that the image can be correctly printed in its entirety including the blank space.

As such, the printing device 200 of this embodiment is capable of generating document image data for both surfaces of a document, i.e., the surface and the underside, and the resulting document image data can be partitioned thereby into a plurality of partition areas. The printing device is also capable of calculating the amount of a blank space for each of the partition areas, and based on the amounts of the blank space, determining whether each of the partition areas is blank or not. The printing device is also capable of calculating a blank ratio for the surface of the document and the underside thereof based on the determination result, and based on the calculated blank ratios, document separation can be performed. As such, the documents can be separated into trays varying in type depending on the value of the blank ratio so that the documents can be separated with ease in accordance with various purposes of recycle uses.

What is more, when the document image data is generated, any component of the underside image possibly observed when the density information is extracted can be removed so that the blank ratio can be calculated for a document with higher accuracy.

Even if with a document whose sides are both printed, the blank ratio is calculated for both sides of the document, and then the document is separated based on one of the blank ratios being larger in value. This achieves document separation with more reliability in accordance with various types of purposes.

Further, based on the information about the proximity of blank spaces, any blank space located away from others is not included for calculation of a blank ratio so that the blank ratio can be calculated with higher accuracy while leaving out any blank spaces not available for recycle use. This thus enables to perform document separation into various types of uses with more reliability.

Still further, documents can be separated into paper-feed trays or paper-eject trays in accordance with the size of the blank space based on the recycle purposes. This enables to separate, with good accuracy, papers into groups, i.e., those good for recycling use and those not.

Still further, based on the blank ratio of a recycling paper, it is possible to perform normal printing, printing position adjustment, layout printing, and others. This accordingly enables any appropriate recycling printing depending on the position of a blank space(s) so that the recycling efficiency can be increased.

In the third embodiment above, the density information extraction section 12 corresponds to the density information extraction unit of the twenty-sixth or thirty-third aspect, and the document image data generation section 14 corresponds to the image data generation unit of the thirty-third aspect. The counting of the blank image lines in the area partition section 16 corresponds to the blank image line counting unit of the thirtieth or thirty-first aspect. The area partitioning in the area partition section 16 corresponds to the area partition unit of any one of the aspects of twenty-sixth, thirties, thirty-first, and thirty-third. The blank amount calculation section 18 corresponds to the blank amount calculation unit of any one of the aspects of twenty-sixth, twenty-eighth, twenty-ninth, and thirty-third, and the document separation section 20 corresponds to the separation unit of any one of the aspects of twenty-sixth, twenty-eighth, and thirty-second.

Also in the third embodiment above, step S106 corresponds to extracting the density information in any one of the aspects of thirty-fourth, forty-first, forty-third, and fiftieth. Steps S108 to S112 correspond to generating the image data in the forty-first or fiftieth aspect. Step S114 corresponds to area partitioning of any one of the aspects of thirty-third, thirty-seventh, thirty-eighth, forty-first, forty-third, forty-seventh, forty-eighth, and fiftieth. Steps S116 to 118 correspond to calculating the amount of a blank space of any one of the aspects of thirty-third, thirty-fifth, thirty-sixth, forty-first, forty-third, forty-fifth, forty-sixth, and fiftieth. Steps S120 to S132 correspond to document separating in any one of the aspects of thirty-third, thirty-fifth, thirty-ninth, forty-third, forty-fifth, forty-ninth.

Also in the third embodiment above, steps S400 to S424 correspond to counting of the blank image lines in any one of the aspects of thirty-seventh, thirty-eighth, forty-seventh, and forty-eighth.

Also in the third embodiment above, the image data acquisition section 22 corresponds to the image data acquisition unit of the twenty-sixth aspect, and the printing section 24 corresponds to the printing unit of the twenty-sixth aspect.

Also in the third embodiment above, step S502 corresponds to acquiring the image data of the thirty-third or forty-third aspect, and steps S504 to S520 correspond to printing of the thirty-third or forty-third aspect.

In the first to third embodiments, exemplified is the case of calculating a blank ratio by partitioning document image data into 16 partition areas. This is surely not restrictive, and the partition number may be smaller than 16 or larger than 16.

In the third embodiment, exemplified is the case that the invention is applied to an ink-jet printing device. This is surely not the only option, and the invention is applicable to various types of printing device, e.g., laser, thermal transfer, sublimation, and impact dot.

The components for implementing the printing medium separation apparatuses 100 of the first and second embodiments or the printing device 200 of the third embodiment can be implemented on software using a computer system. A computer program may be provided to users whoever desires the program with ease by being stored in a semiconductor ROM in advance for incorporation into a product, by being distributed over a network such as the Internet, or via a computer-readable recording medium such as CD-ROM, DVD-ROM, FD, and others.

Moreover, in the first to third embodiments above, document image data is generated based on density information extracted from the surface of a document, i.e., printing area, by the density information extraction section 12. The data generation is performed with binarization to pixel values and removing any component of the underside images, and the resulting document image data is used as a basis to calculate the amount of a blank space. This is surely not restrictive, and the density information extracted by the density information extraction section 12 is used as it is for use for a calculation of the amount of a blank space. If this is the case, if the RGB value extracted for each of the pixels is summed up to 600 or more, a determination is made as white, and if not, a determination is made as black.

What is claimed is:

1. A printing medium separation apparatus comprising:

a density information extraction unit that extracts density information about a predetermined printing area of a printing medium for use to print an image;

an area partition unit that partitions the printing area into a plurality of partition areas;

a blank amount calculation unit that calculates, based on the density information extracted for each of the partition areas being results of partitioning by the area partition unit, a blank amount of each of the partition areas; and a separation unit that subjects the printing medium to separation based on a result of calculating by the blank amount calculation unit, wherein based on the blank amount calculated for each of the partition areas, the blank amount calculation unit determines whether each of the partition areas is blank or not, and based on a determination result, calculates a blank ratio for the printing area, and the separation unit subjects the printing medium to the separation based on the blank ratio being a result of calculating by the blank amount calculation unit, and wherein the blank amount calculation unit calculates a total number of the partition areas of an area in which two or more of the partition areas determined as being blank are located in a row, and based on the total number being a calculation result, calculates the blank ratio.

2. A printing medium separation apparatus comprising:

a density information extraction unit that extracts density information about a predetermined printing area of a printing medium for use to print an image;

an area partition unit that partitions the printing area into a plurality of partition areas;

a blank amount calculation unit that calculates, based on the density information extracted for each of the partition areas being results of partitioning by the area partition unit, a blank amount of each of the partition areas;

a separation unit that subjects the printing medium to separation based on a result of calculating by the blank amount calculation unit; and a blank image line counting unit that counts, based on the density information about the predetermined printing area specifically for a plurality of image lines in a vertical direction and for a plurality of image lines in a lateral direction, for each of the directions, a number of blank image lines each configured by a pixel of a density value indicating a color of white, wherein the area partition unit partitions, based on a result of counting by the blank image line counting unit, the predetermined printing area into the plurality of partition areas.

3. The printing medium separation apparatus according to claim 2, wherein the area partition unit repeatedly subjects each of the partition areas to the counting of the blank image lines by the blank image line counting unit, and based on the result of counting, to the partitioning by the area partition unit until the printing area is partitioned into a desired number of partition areas.

* * * * *